United States Patent [19]

Okamoto et al.

[11] Patent Number: 5,736,269
[45] Date of Patent: Apr. 7, 1998

[54] FUEL CELL STACK AND METHOD OF PRESSING TOGETHER THE SAME

[75] Inventors: Takafumi Okamoto; Hideo Kato; Norimasa Kawagoe; Akio Yamamoto; Ichiro Tanaka, all of Wako, Japan

[73] Assignee: Honda Giken Kogyo Kabushiki Kaisha, Tokyo, Japan

[21] Appl. No.: 674,922

[22] Filed: Jul. 3, 1996

Related U.S. Application Data

[63] Continuation-in-part of Ser. No. 419,417, Apr. 10, 1995, Pat. No. 5,534,362, which is a continuation of Ser. No. 78,788, Jun. 17, 1993, Pat. No. 5,419,980.

[30] Foreign Application Priority Data

| Jun. 18, 1992 | [JP] | Japan | 4-182860 |
| Jul. 13, 1992 | [JP] | Japan | 4-206977 |
| Jun. 14, 1996 | [JP] | Japan | 8-154624 |

[51] Int. Cl.$^6$ .................................................. H01M 8/10
[52] U.S. Cl. .................................. 429/32; 429/38; 429/44
[58] Field of Search .............................. 429/26, 32, 38, 429/44

[56] References Cited

U.S. PATENT DOCUMENTS

| 4,826,742 | 5/1989 | Reiser | 429/33 |
| 5,262,249 | 11/1993 | Beal et al. | 429/26 |
| 5,346,780 | 9/1994 | Suzuki | 429/32 X |

Primary Examiner—Stephen Kalafut
Attorney, Agent, or Firm—Lyon & Lyon LLP

[57] ABSTRACT

A fuel cell stack having unit cells and separators, in which each unit cell comprises a solid polymer electrolyte membrane having a pair of electrode catalysts attached on both surfaces, and a pair of collectors, each made of a rigid body, being in contact with respective electrode catalysts, and each of the separators comprises a pair of pressure generating plates defining therebetween a pressure chamber to which a pressurized fluid is introduced, the pressure generating plates being deformed by the pressurized fluid and pressed against the adjacent respective collectors.

15 Claims, 20 Drawing Sheets

PRIOR ART

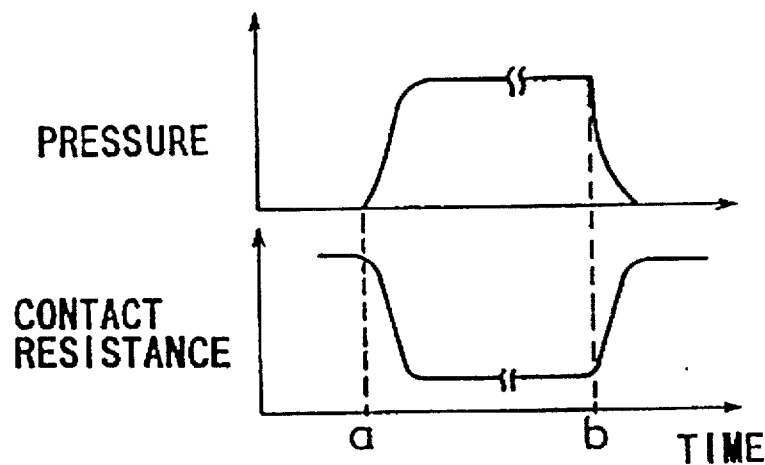
PRESSURE  Fig. 10A
CONTACT RESISTANCE  Fig. 10B
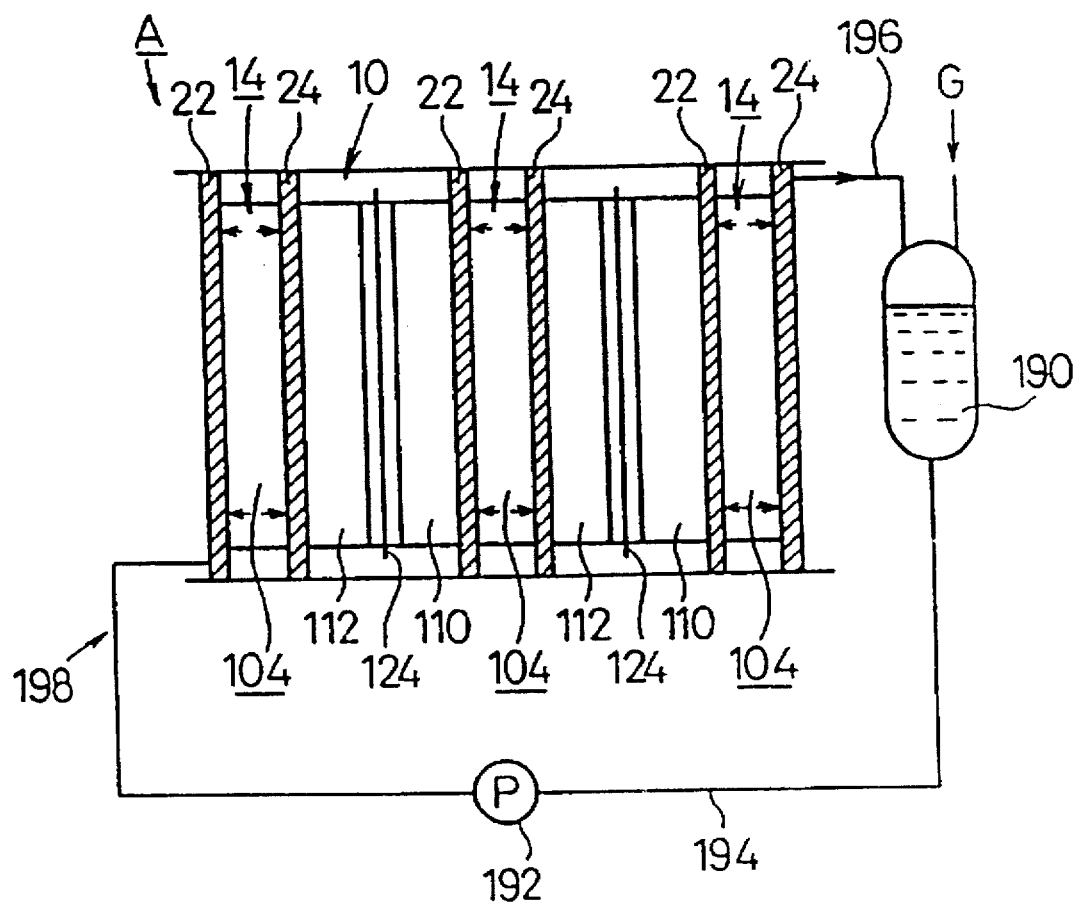
FIG.11

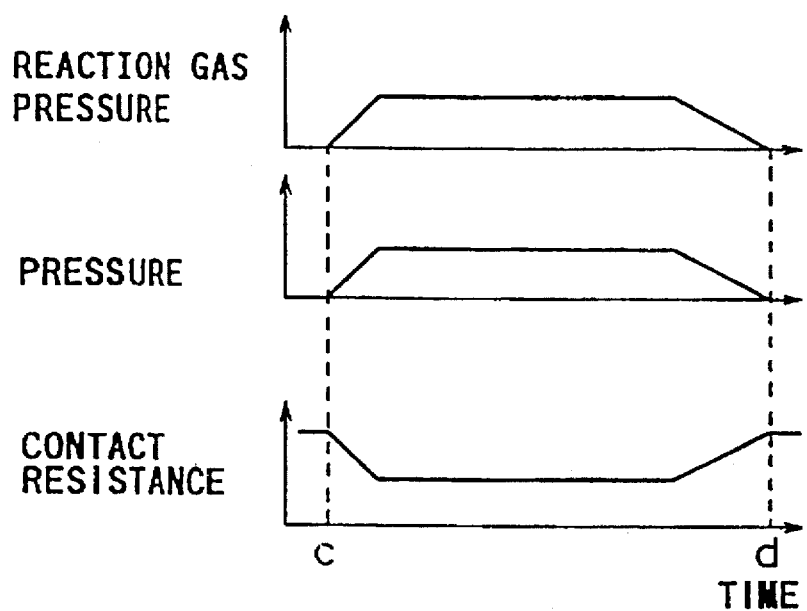
Fig. 12A
Fig. 12B
Fig. 12C
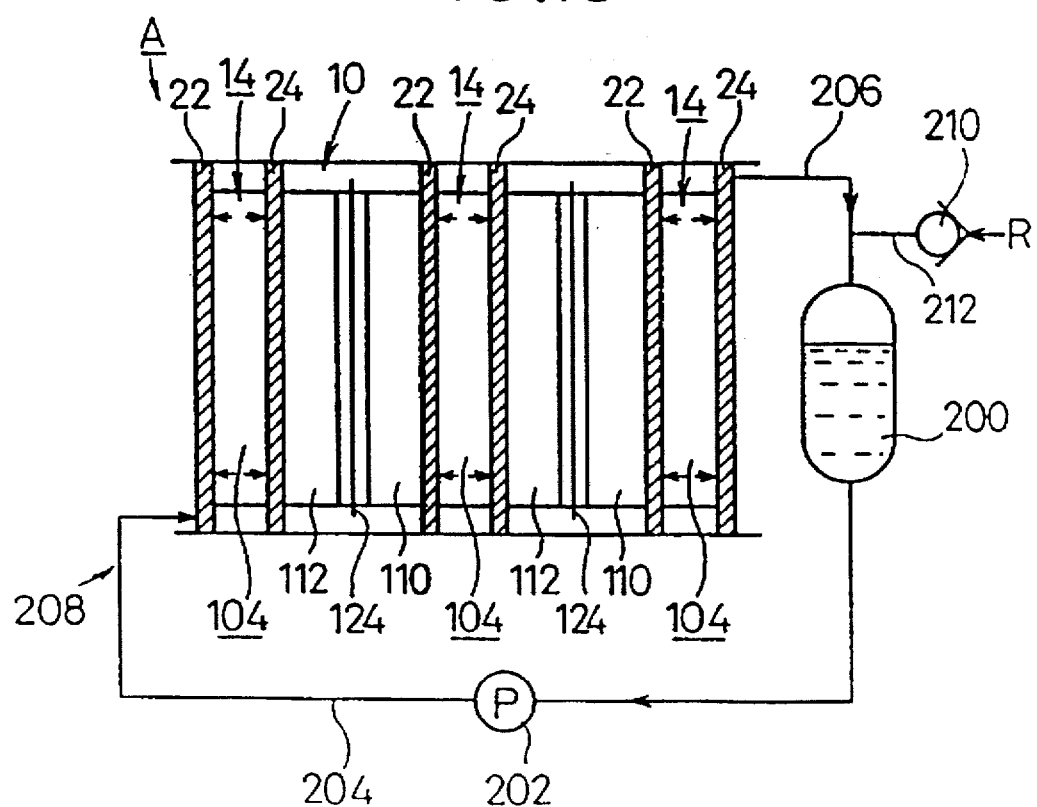
FIG.13

FUEL CELL STACK AND METHOD OF PRESSING TOGETHER THE SAME

CROSS REFERENCE TO RELATED APPLICATIONS

This application is a Continuation-in-Part application of Ser. No. 08/419,417, filed Apr. 10, 1995, now U.S. Pat. No. 5,534,362, issued Jul. 9, 1996, which was a continuation application of Ser. No. 08/078,788, filed Jun. 17, 1993, now U.S. Pat. No. 5,419,980.

BACKGROUND OF THE INVENTION

1. Field of the Invention

This invention relates to a fuel cell stack and a method of pressing its elements together, wherein the fuel cell stack includes a plurality of fuel cell separators, each disposed between fuel cells and having a space therein into which a pressurized fluid is supplied to apply the pressure developed by an internal pressure of the space to the neighboring fuel cells.

2. Description of the Related Art

Developments in fuel cells ("FC"s) are remarkable today. An FC generates electric power from a reaction gas. FIG. 1 shows an internal manifold type PC as an example of conventional FCs. The structure of this type FC will be described hereafter.

An FC stack ("S") is constructed by stacking a number of unit fuel cells ("TC"s) on one another and mounting end plates ("EP"s) to both ends of the stack of the TCs. The TC has a power generating unit ("H") and a pair of holding units ("K"s) disposed on both sides of the H. The H comprises an electrolyte layer and a pair of catalytic electrodes ("CA"s) attached on both sides of the electrolyte layer. A pair of collectors ("CO"s) are positioned between the H in the center of the TC and the Ks on both sides of the H.

Then, the EPs are pressed together by compression means such as bolts B with coil springs C. That is, the conventional method of pressing the FC stack together has been such that the H and the Ks of each TC are simultaneously clamped by compression means such as the bolts B.

In the above S, one of the EPs acts as a pressure generating member ("MH"), in which a recess ("HB"), covered with a membrane ("L"), is defined and a balloon is provided in the HB so as to be inflated to fill the HB. Then, $H_2$ or $O_2$ as a reaction gas ("G") for the FC is introduced into the MH through a supply line ("KP") connected to the MH through the EP, and inflates the balloon in the MH. As a result, the L is flexed and pressed against the neighboring TC, applying a compression force thereto.

Stacking the TC on one another while applying a pressure to each TC, as described above, enables the FC to avoid variation in contact resistance-between the electrode catalysts and collectors, between the H and Ks, and between the TCs, to assure a constant output voltage therefrom.

There have been, however, problems in the conventional method of stacking FC, as follows.

(A) In the method of stacking the FC as shown in FIG. 1, a recess is defined on an inner surface of the K in which respective one of the CAs and COs are held. It is therefore necessary to accurately match the depth of the recess of respective Ks with the thicknesses of the CA and CO. That is, each TC must be fabricated with high accuracy.

(B) In the above method of stacking the FC, the compression bolts B have twofold tasks: one is to seal passages for reaction gas internally defined in the respective members by pressing the respective members against each other, and the other is to press the CAs and COs in respective TCs. However, required pressure for sealing the passages and pressing the CAs and COs are generally different, because the purpose and use of them are different from each other. Therefore when the bolts B are tightened under a suitable pressure to press the CAs and COs, there is a danger of inappropriate sealing of the passages, and vise versa.

(C) In the conventional method described above, the compression force is applied on both ends or only one end of the stack S to press the constitutive members. Thus, as the number of the TC to be stacked increases, the number of members having force relaxing nature (such as sealing members) also increases. As a result, the compression force applied to the S is not sufficiently transferred to each of the TCs, due to partly deformation of respective members, causing insufficient pressing together of the TCs.

In order to overcome the inconvenience raised in (C), it has been necessary to adopt either one of applying a larger force to press together the constitutive members, or restricting the number of the TCs in one stack S. However, when the former is selected, the use of fragile materials such as carbon, plastic, ceramic, etc. in each TC must be restricted.

When the latter is selected, it is necessary to series-connect several Ss each having a restricted number of TCs therein to obtain a desired voltage. This makes piping for the reaction gas, or arrangement of auxiliary instruments, etc. complex, and increases the space to be occupied by the FC. Further, an integrated control of the series-connected Ss is not necessarily easy.

(D) in the conventional PC, it has often been seen that one cooling plate is placed for a series of several TCS in one S. In this structure, the temperature of a series of TCs placed between a pair of cooling plates is maintained constant, but that constant temperature may be different from the temperatures of other series of TCs. This temperature difference can cause an insufficient cooling of the TCs in an operation at a high current density.

In addition to the above, a method of compressing the S has been proposed by U.S. Pat. No. 4,317,864. In this method contact members are placed between respective TCs constituting an S, each contact member having a chamber defined therein. A pressurized fluid to be fed to the TCs is introduced into the chambers so that the contact members are expanded to press the CAs. Thus, the COs are brought into close contact with their corresponding CAs. Therefore, if the contact members are provided for every TCs, a pressure different from the pressure used for sealing the fluid passages can be applied to each CA. In stacking a plurality of TCs on one another a uniform pressure can be applied to the respective TCs.

However, since the Cos employed in each TC are thin, it is difficult to apply a uniform pressure to the COs through the expanding contact members. Further, the pressure applied to each CO is low, because the pressure of the pressurized fluid has been exhausted in expanding each contact member. That is, the efficiency in transferring pressure is poor. As a result, the contact resistance between the CAs and Cos cannot be lowered sufficiently and a desired output voltage cannot be attained.

SUMMARY OF THE INVENTION

The present invention has been made to overcome the foregoing problems. The object of the present invention is, accordingly, to provide a fuel cell stack and a method of squeezing it together wherein pressure for squeezing the fuel cell stack together is simultaneously produced in each unit cell by a pressurized fluid when each unit cell is activated by the fluid.

According to one aspect of the present invention, for achieving the above object, there is provided a fuel cell stack comprising a plurality of unit cells for taking out electrical energy from a reaction gas and a plurality of separators interposed between said unit cells, wherein each of said unit cells comprises a solid polymer electrolyte membrane having a pair of electrode catalysts attached on both surfaces thereof, and a pair of collectors, each made of a rigid body, being in contact with respective said electrode catalysts, and each of said separators comprises a pair of pressure generating plates defining therebetween a pressure chamber into which a pressurized fluid is introduced, said pressure generating plates being deformed by the pressurized fluid and pressed against adjacent respective said collectors.

In the fuel cell stack of the present invention constructed as described above, the pressurized fluid is introduced into the pressure chamber formed in each, separator and the pressure forcing the elements of the fuel cell stack together is applied on each of the collectors by the adjacent pressure generating plate. As a result, the collectors are slightly displaced so as to compress each of the solid polymer electrolyte membranes therebetween. Since each of the collectors is made of the rigid body and the solid polymer electrolyte membranes are held by the corresponding collectors, the solid polymer electrolyte membranes are uniformly pressed by the collectors and the contact resistance between each of the collectors and the solid polymer electrolyte membrane is reduced.

According to another aspect of the present invention, there is provided a method of pressing together the unit cells of a fuel cell stack which comprises a plurality of unit cells for taking out electrical energy from a reaction gas and separators interposed between respective unit cells, comprising the steps of introducing a pressurized fluid into a pressure chamber formed in each of said separators transferring a pressure in the pressure chamber due to the pressurized fluid to each of the collectors in the neighboring unit cells through pressure generating plates provided in respective separators; and pressing each of the collectors against each of the electrode catalysts respectively disposed on both sides of a solid polymer electrolyte membrane of the unit cell by displacement of the pressure generating plates.

According to the method of pressing together the unit cells of the fuel cell stack referred to above, since the collectors, each being a rigid body, are uniformly pressed against the solid polymer electrolyte membranes of the unit cells, a low contact resistance between the collectors and the solid polymer electrolyte membranes is attained.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIGS. 10A and 10B are graphs illustrating the relationship between the pressure for pressing together the fuel cell stack during coolant circulation, the contact resistance and the time;

FIG. 11 is a schematic system diagram showing a coolant circulating circuit employed in a second embodiment illustrative of a fuel cell stack compressing method according to the present invention;

FIGS. 12A, 12B and 12C are graphs showing the mutual relationship among tie pressure of a reaction gas, the pressure pressing together the fuel cell stack, the contact resistance and the time;

FIG. 13 is a schematic system diagram showing a coolant circulating circuit employed in a third embodiment illustrative of a fuel cell stack compressing method according to the present invention;

DETAILED DESCRIPTION OF THE PREFERRED EMBODIMENTS

The present invention will be described in detail with reference to the accompanying drawings in which preferred embodiments are shown by way of illustrative example.

A description will first be made of the structure of a fuel cell stack according to the present invention.

Figure 3:
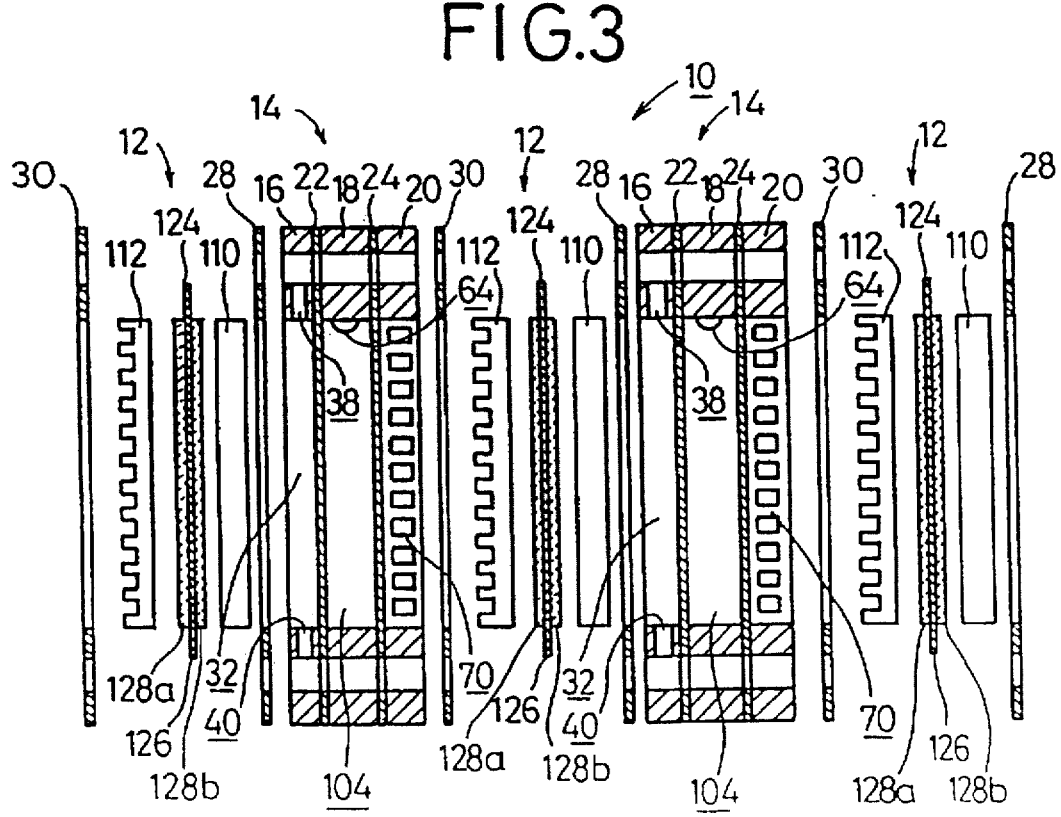
FIG. 3 is a partially exploded vertical cross-sectional view showing a fuel cell stack as an embodiment of the present invention.
Figure 4:
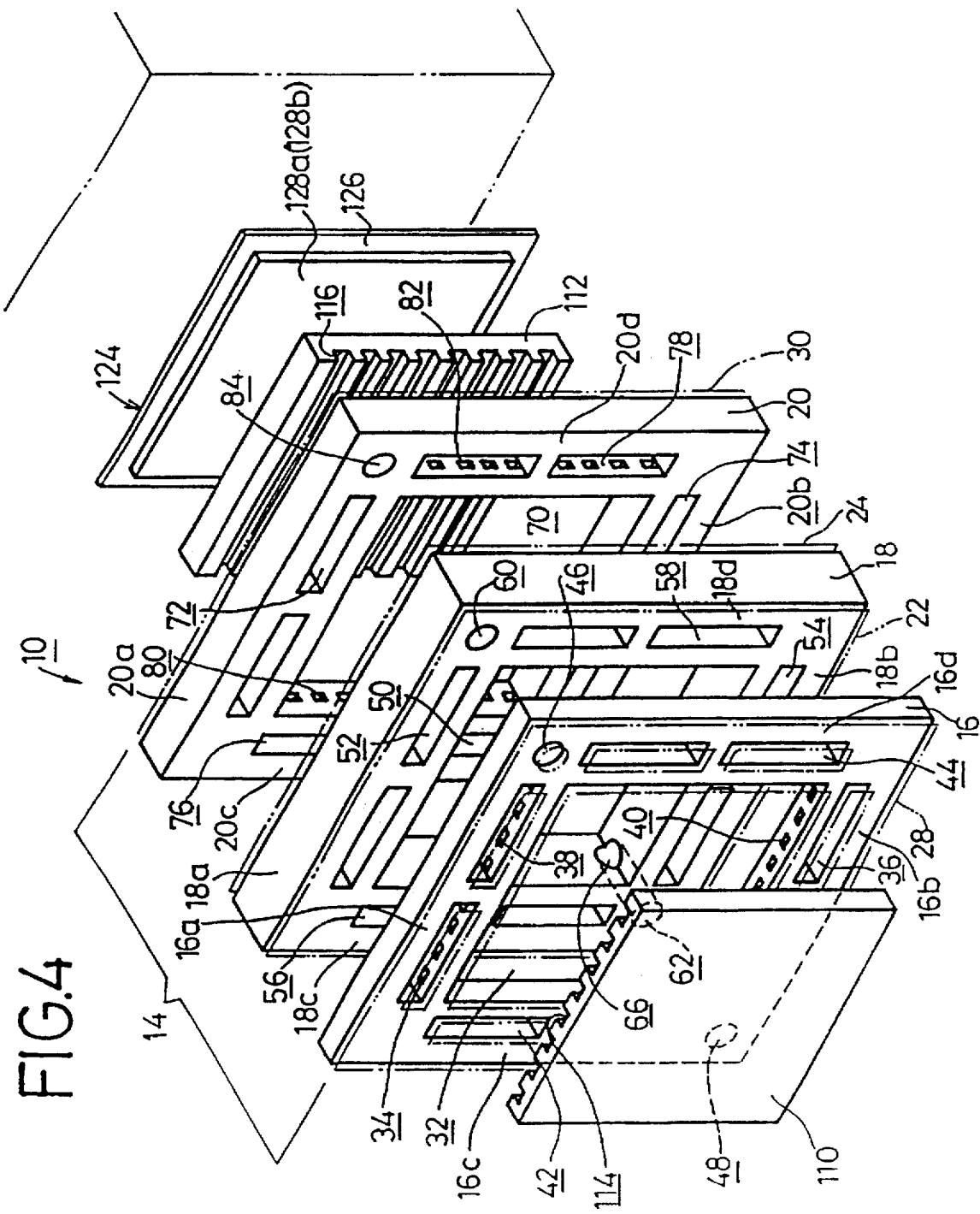
FIG. 4 is a partially exploded perspective view illustrating a part of the fuel cell stack shown in FIG. 3.

Referring to FIGS. 3 and 4, the fuel cell stack 10 basically comprises a plurality of cell units 12 and a plurality of holding units (hereinafter called "separators") 14. Each of the separators 14 has a first plate 16, a second plate 18 and a third plate 20 all of which are relatively thick. A first pressure generating plate 22 is interposed between the first plate 16 and the second plate 18. On the other hand, a second pressure generating plate 24 is interposed between the second plate 18 and the third plate 20. The first plate 16, the first pressure generating plate 22, the second plate 18, the second pressure generating plate 24, the third plate 20 are stacked on one another in that order to form a separator. Incidentally, reference numerals 28 in the drawings indicate first gaskets each mounted on one surface of the first plate 16. Further, reference numerals 30 indicate second gaskets each mounted on one surface of the third plate 20.

A description will now be made of the first plate 16. As is understood from FIGS. 3 and 4, a large opening or hole 32 shaped substantially in the form of a square is centrally defined in the first plate 16. A pair of through-holes 34 each shaped in the form of a rectangle and a similar pair of through-holes 36 are respectively defined in upper and lower frames 16a and 16b of the first plate 16 so as to surround the large hole 32. Each of the through-holes 34 communicates with the large hole 32 through a plurality of pores 38. On the other hand, each of the through-holes 36 communicates with the large hole 32 through a plurality of pores 40 in the same manner as described above.

A pair of through-holes 42, which are similar to the through-holes 34, 36 and extend in the vertical direction as viewed in FIGS. 3 and 4, are defined in a side frame 16c of the first plate 16, whereas a pair of through-holes 44 similar to the through-holes 42 are also defined in a side frame 16d of the first plate 16. A communication hole 46 and a communication hole 48 are respectively defined in the corner formed by the upper frame 16a and the side frame 16d of the first plate 16 and the corner formed by the lower frame 16b and the side frame 16c.

The second plate 18 will now be described below. A large opening or hole 50 similar to the large hole 32 of the first plate 16 is centrally defined in the second plate 18. Further, through-holes 52 are defined in an upper frame 18a of the second plate 18 and through-holes 54 are defined in a lower frame 18b thereof. On the other hand, through-holes 56 and through-holes 58 are respectively defined in side frames 18c and 18d of the second plate 18. A communication hole 60 is defined in the corner formed by the upper frame 18a and the side frame 18d, whereas a communication hole 62 is defined in the corner formed by the lower frame 18b and the side frame 18c. The communication holes 60 and 62 communicate with each other through the large hole 50 and holes 64 and 66 (see FIG. 2). Incidentally, the second plate 18 is not provided with pores corresponding to the pores 38 and 40 defined in the first plate 16.

Figure 1:
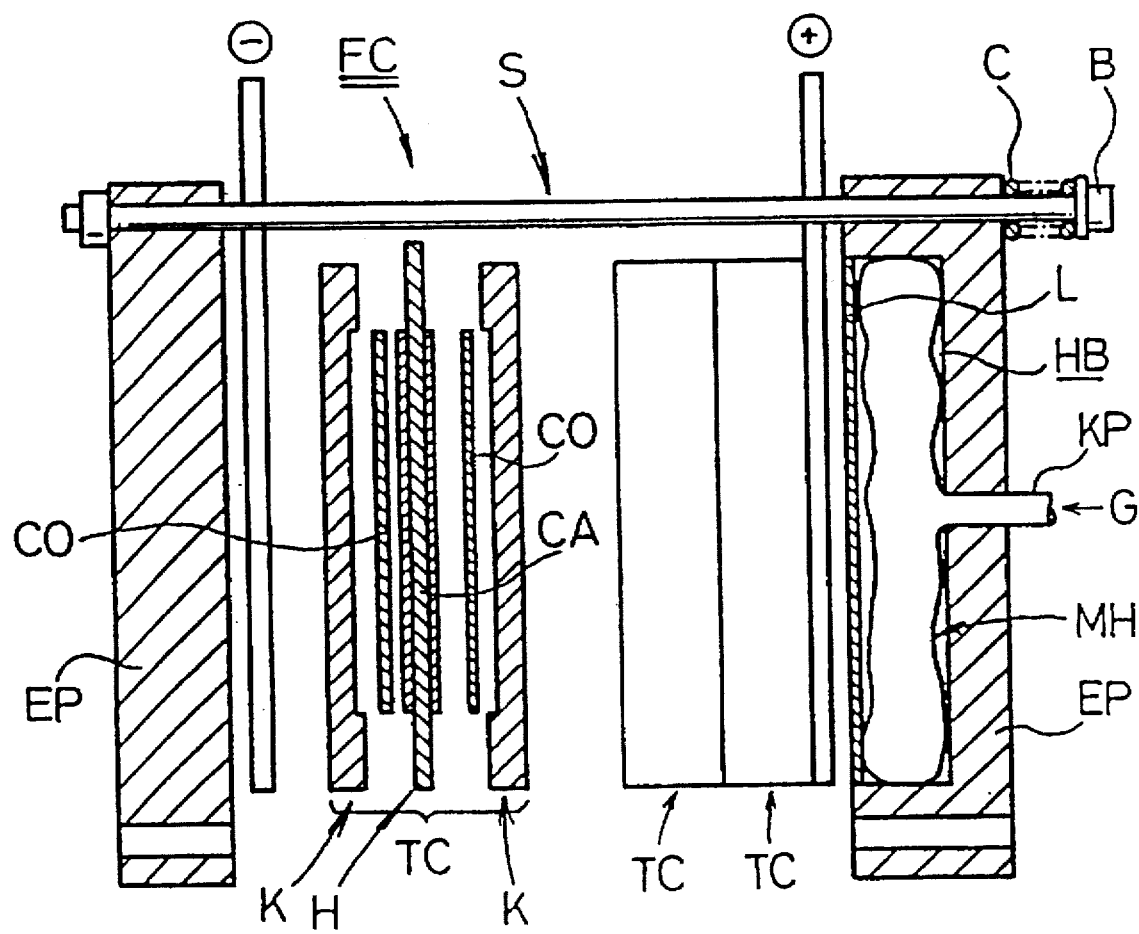
FIG. 1 is a vertical cross-sectional view showing the structure for squeezing the unit cells of a conventional internal manifold type fuel cell stack.
Figure 2:
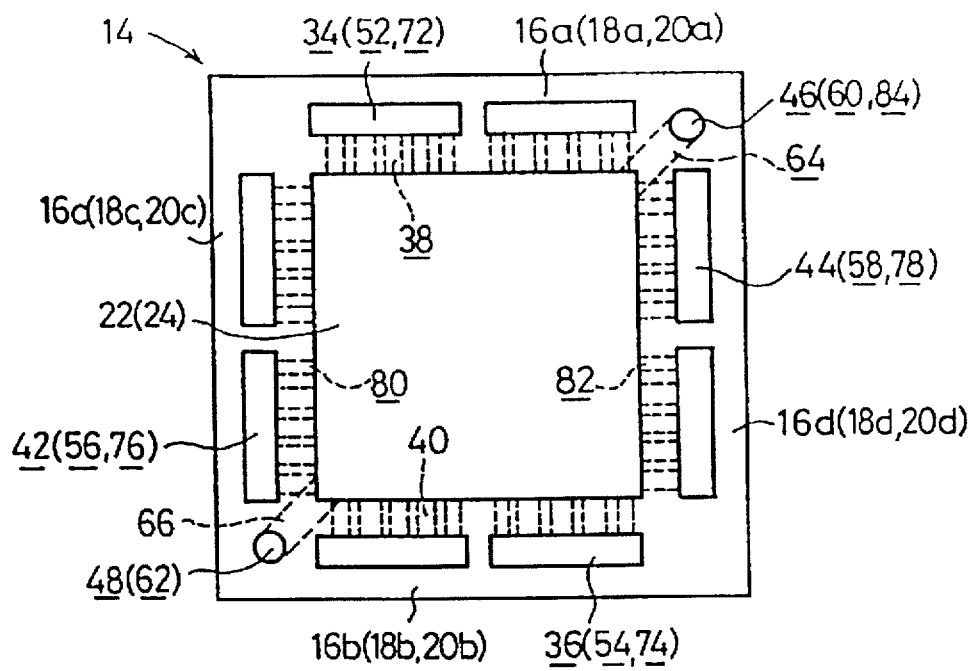
FIG. 2 is a plan view showing through-holes, communication holes, pores and small holes respectively formed in first, second and third plates which constitute a separator in a fuel cell stack as an embodiment of the present invention.

A description will further be made of the third plate 20. A large opening or hole 70 similar to the large holes 32 and 50 of the first and second plates 16 and 18 is centrally defined in the third plate 20. Through-holes 72 each shaped in the form of a rectangle and through-holes 74 similar to the through-holes 72 are respectively defined in upper and lower frames 20a and 20b of the third plate 20 so as to surround the large hole 70. Through-holes 76 are defined in a side frame 20c of the third plate 20 and through-holes 78 are defined in a side frame 20d thereof. In the third plate 20, the large hole 70 and the through-holes 76 communicate with one another through a plurality of pores 80. Similarly, the large hole 70 and the through-holes 78 communicate with one another through a plurality of pores 82. The pores 80 and 82 in the third plate 20 are oriented in a direction at 90° to the direction of pores 38 and 40 in the first plate 16, as illustrated in FIGS. 2, 3 and 4. A communication hole 84 is defined in the corner formed by the upper frame 20a and the side frame 20d of the third plate 20. An unillustrated communication hole is defined in the corner formed by the lower frame 20b and the side frame 20c at the position corresponding to each of the communication hole 48 of the first plate 16 and the communication hole 62 of the second plate 18.

Figure 5:
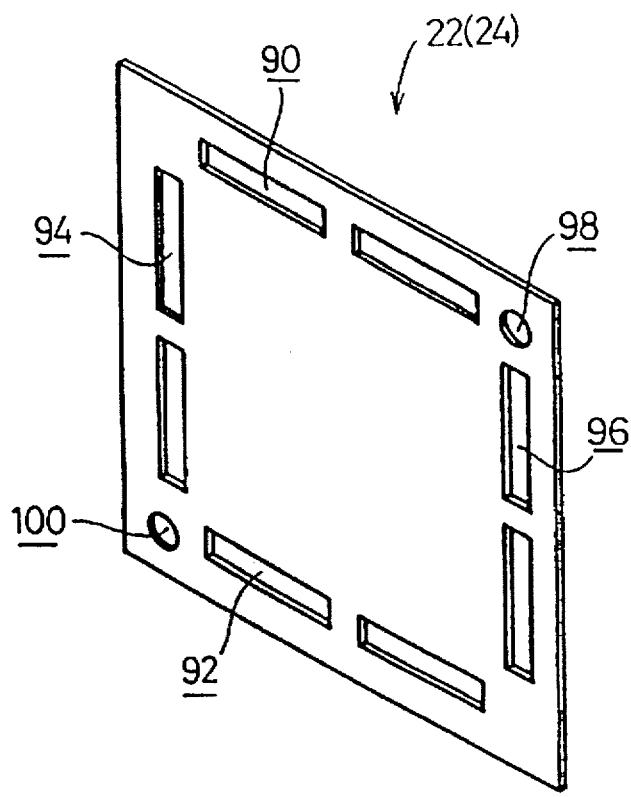
FIG. 5 is a perspective view depicting a bearing pressure generating plate of the fuel cell stack shown in FIG. 3.

The first and second pressure generating plates 22 and 24 will now be described with reference to FIG. 5. Each of the first and second pressure generating plates 22 and 24 is made of stainless steel. As shown in FIG. 5, each of the first and second pressure generating plates 22 and 24 has through-holes 90, 92, 94 and 96 associated with the throughholes respectively defined in the upper, lower and side frames of the first, second and third plates 16, 18 and 20. Further, a communication hole 98 is defined in one of the corners of each of the first and second pressure generating plates 22 and 24 so to correspond to each of the communication holes 46, 60 and 84. Moreover, a communication hole 100 is defined in the corner diagonally opposite to said one corner so as to correspond to each of the communication holes 48 and 62 and the unillustrated communication hole defined in the corner formed by the side frame 20c and the lower frame 20b of the third plate 20.

When the first late 16, the first pressure generating plate 22, the second plate 18, the second pressure generating plate 24 and the third plate 20, all constructed as described above, are stacked on one another so as to be formed,as the separator 14, a pressure chamber 104 (see FIG. 3), which serves as a cooling chamber is defined between the first pressure generating plate 22 and the second pressure generating plate 24.

Referring again to FIGS. 3 and 4, the cell unit 12 will next be described below.

The cell unit 12 basically comprises a pair of collectors 110 and 112, and a membrane-electrode assembly 124 interposed between the collectors 110 and 112. Each of the collectors 110 and 112 is made of carbon as a rigid body.

The collector 110 is made of a plate shaped substantially in the form of a square and substantially identical in thickness to the first plate 16, which is fitted in the large hole 32 of the separator 14 with a slight gap formed therebetween.

As shown in FIG. 4, the collector 110 has a plurality of grooves 114 which are formed therein to communicate with the pores 38 and 40 of the first plate 16 and enlarge the surface area of the collector 110 in order for the porous carbon material to more readily absorb the reaction gas. Thus, when the collector 110 is fitted in the large hole 32 of the first plate 16, the grooves 114 communicate with the through-holes 34 and 36 through the pores 38 and 40 respectively. When the collector 110 is pressed by the first pressure generating plate 22, it can be displaced within the large hole 32 of the first plate 16 in the direction perpendicular to the direction in which the grooves 114 extend.

The collector 112 is made of a plate which is shaped substantially in the form of a square corresponding to the large hole 70 of the third plate 20 and which is substantially identical in thickness to the third plate 20. A plurality of grooves 116, which communicate with the pores 80 and 82 formed in the third plate 20t are defined in the collector 112. Thus, when the collector 112 is fitted in the large hole 70 of the third plate 20, the grooves 116 communicate with the through-holes 76 and 78 through the pores 80 and 82 respectively. When the collector 112 is pressed by the second pressure generating plate 24, it can be displaced within the large hole 70 of the third. plate 20 in the direction perpendicular to the direction in which the grooves 116 extend.

The membrane-electrode assembly 124 has electrode catalyst layers 128a and 128b formed on both surfaces of a solid polymer electrolyte membrane 126. The solid polymer electrolyte membrane 126 is substantially identical in size to the inner edges of the through-holes 34, 36, 42 and 44. On the other hand, the electrode catalyst layers 128a and 128b are substantially identical in size to the collectors 110 and 112.

Figure 6:
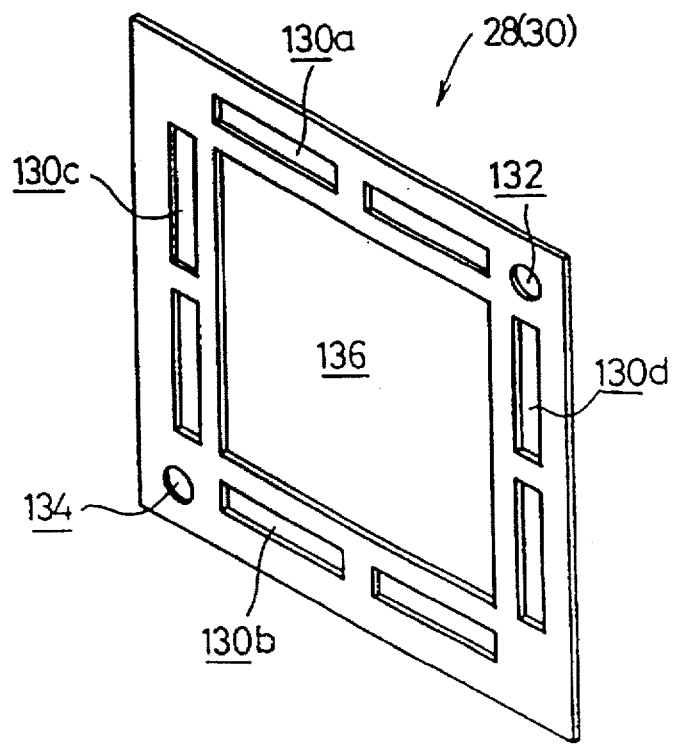
FIG. 6 is a perspective view showing a gasket of the fuel cell stack shown in FIG. 3.

FIG. 6 shows the structure of each of the gaskets 28 and 30. As shown in FIG. 3, the gaskets 28 an 30 are interposed between the first plate 16 and the third plate 20. The membrane-electrode assembly 124 is interposed between the gaskets 28 and 30. As will be described later, each of the gaskets 28 and 30 has through-holes 130a through 130d, communication holes 132 and 134 and a large opening or hole 136 defined therein in such a manner that a pressurized fluid is caused to flow between the first plate 16 and the third plate 20 and the collectors 110 and 112 are brought into contact with the membrane-electrode assembly 124.

Figure 7:
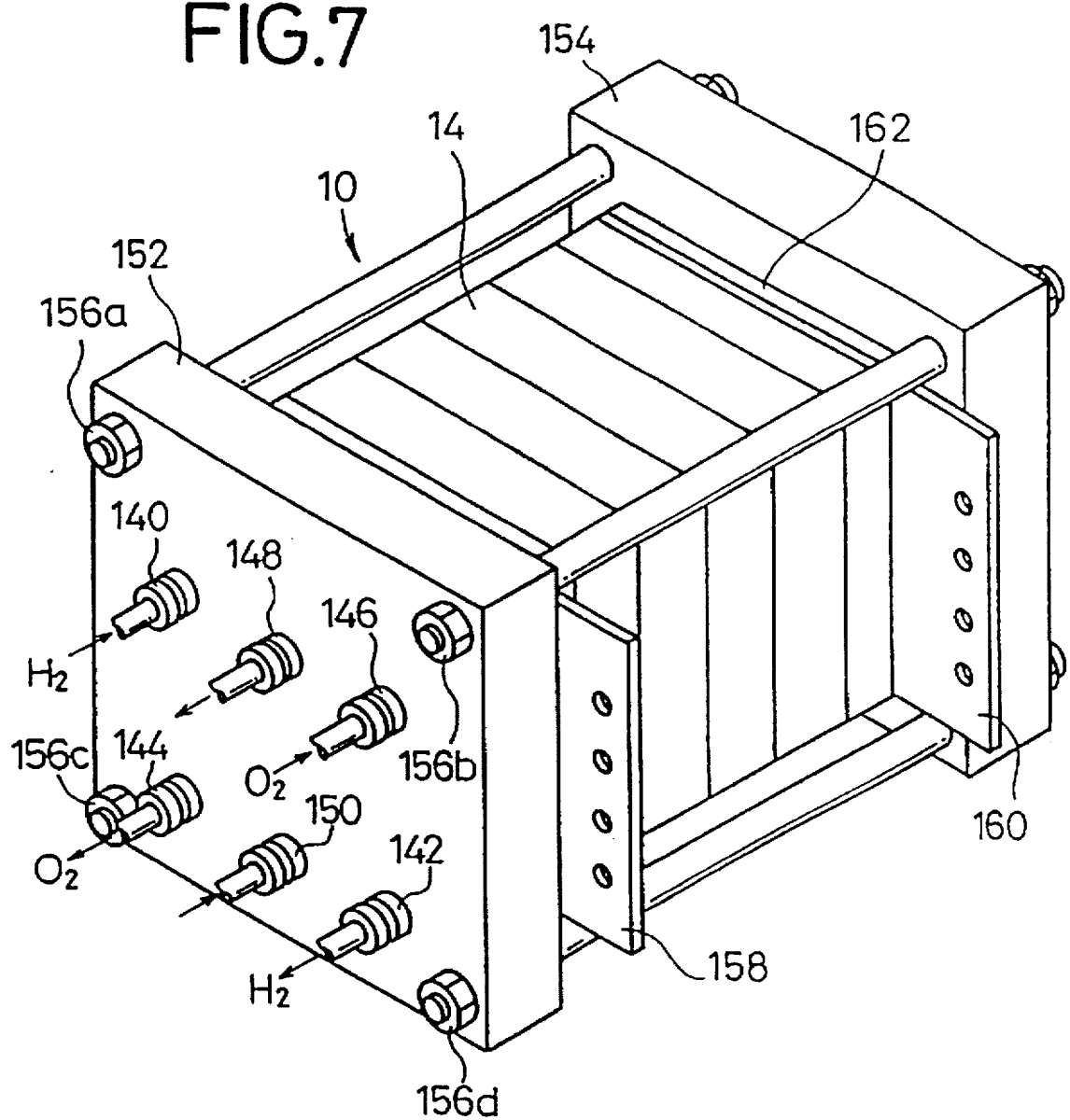
FIG. 7 is a perspective view illustrating the manner of pressing together the unit cells and separators of the fuel cell stock shown in FIG. 3.

In the cell units 12 and the separators 14 constructed as described above, each of the collectors 110 is displaceably fitted in the large hole 32 of the first plate 16 and each of the collectors 112 is displaceably fitted in the large hole 70 of the third plate 20. The smooth surfaces of the first and second collectors 110 and 112 are brought into contact with their corresponding electrode catalysts 128a and 128b. Further, a part of the membrane-electrode assembly 124, which is not covered by the electrode catalysts 128a and 128b, is held in contact with the gaskets 28 and 30. Thus, all of the gaskets 28, the first plates 16, the first pressure generating plates 22, the second plates 18, the second pressure generating plates 24, the third plates 20, the gaskets 30, and the membrane-electrode assemblies 124 are stacked on one another in that order to form the whole fuel cell stack 10. When these components are stacked and fixed, end plates 152 and 154 are attached to both ends of the fuel cell stack 10 as shown in FIG. 7. The end plate 152 has pipe fittings 140, 142 144 and 146 which respectively communicate with the through-holes 34, 36, 42 and 44 of the first plate 16, and pipe fittings 148 and 150 which respectively communicate with the communication holes 46 and 48. The end plate 154 has no lines connected thereto. Further, the four corners of each of the end plates 152 and 154 are firmly and uniformly pressed together by bolts 156a through 156d respectively. Incidentally, a terminal plate 158 for taking out voltage and an insulating plate are interposed between the end plate 152 and the separator 14 adjacent to the end plate 152. Further, a terminal plate 160 and an insulating plate 162 are interposed between the end plate 154 and the separator 14 adjacent to the end plate 154.

Figure 8:
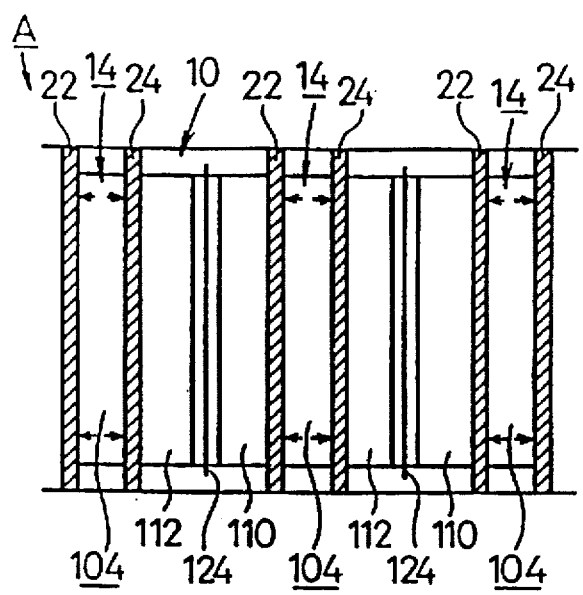
FIG. 8 is a vertical cross-sectional view showing a part of the fuel cell stack shown in FIG. 3.

Thus, when a fuel cell A (see FIG. 8) under the above construction is shut down, the pressure generating plates 22 and 24 (see FIG. 3) of each separator 14 maintain the same relationship as they have been assembled with respect to the collectors 110 and 112 provided adjacent to both sides of the pressure generating plates 22 and 24. When, on the other hand, the fuel cell A is started up, the pressurized fluid reaches the communication hole 62 through the pipe fitting 150 (see FIG. 7) of the end plate 152. The pressurized fluid flows into the pressure chamber 104 via the hole 66 (see FIG. 2), so that the internal pressure of the pressure chamber 104 is raised. Accordingly, the pressure generating plates 22 and 24 produce forces which expand toward both sides thereof so as to press the collectors 110 and 112 respectively. As a result, the membrane-electrode assembly 124 is held under uniform pressure by the collectors 110 and 112 each formed as a rigid body (made of pintered material) and hence the pressure for squeezing the fuel cell stack increases. Thus, the collectors 110 and 112 are held extremely closely to the membrane-electrode assembly 124, so that the contact resistance between each of the respective collectors 110, 112 and the membrane-electrode assembly 124 is reduced.

When the pressurized fluid is stopped from flowing into each pressure chamber 104 after the operation of the fuel cell A has been finished, the pressurized fluid in each pressure chamber 104 passes through the hole 64 and the through-hole 60 and is then discharged to the outside from the pipe fitting 148 of the end plate 152. As a result, the internal pressure in each pressure chamber 104 is reduced. Accordingly the pressure transferred to the collectors 110 and 112 by the pressure generating plates 22 and 24 is also reduced so as to return to the pressure under which the fuel cell stack 10 has been assembled.

Next, several embodiments each descriptive of a method of pressing together a fuel cell stack will be described below. Incidentally, fluid passages of pressurized fluid necessary for pressing together the fuel cell stack are described in these embodiments, however, description and illustration are omitted here of the fuel lines for activating the fuel cells, which are provided in a fuel cell system as a matter of course.

A first embodiment according to the present invention wherein a liquid coolant is used as the pressurized fluid employed in the present invention, will first be described with reference to FIGS. 9, 10A and 10B.

Figure 9:
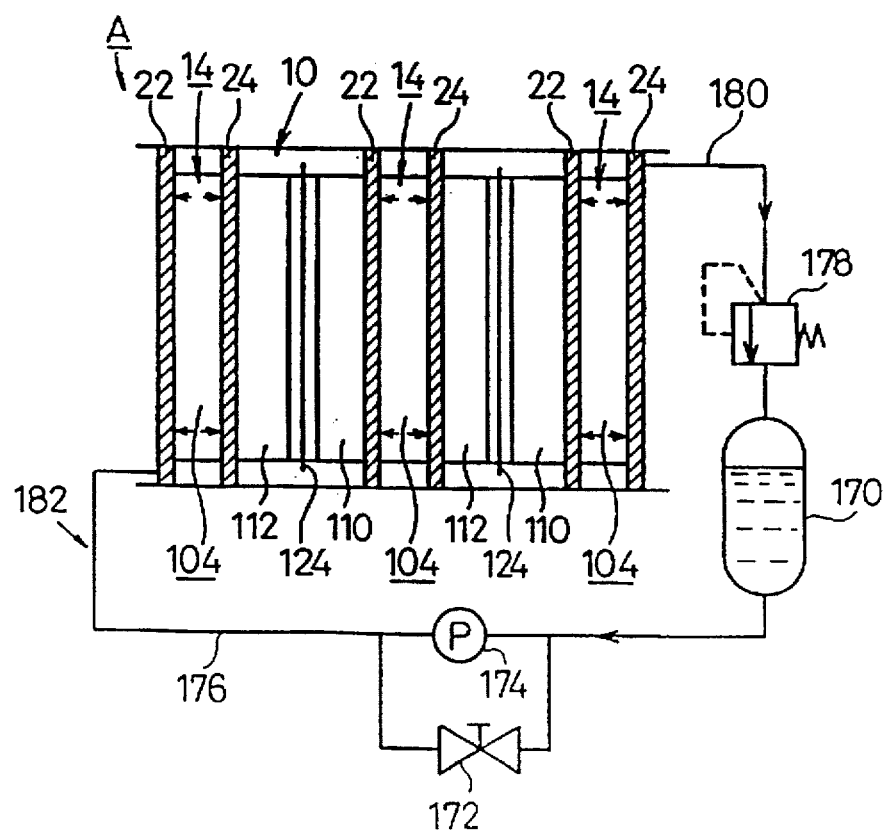
FIG. 9 is a schematic system diagram showing a coolant circulating circuit employed in a first embodiment illustrative of a fuel cell stack compressing method according to the present invention.
Figure 14A:
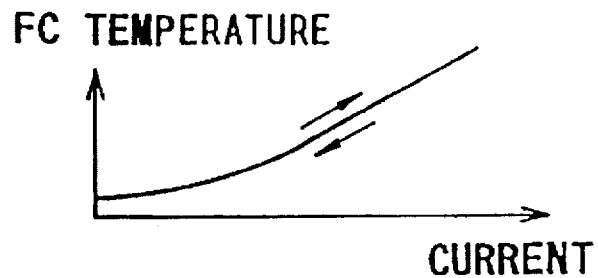
FIG. 14A is a view illustrating the relationship between the temperature of a fuel cell and the current at the time of coolant circulation in the third embodiment shown in FIG. 13.
Figure 14B:
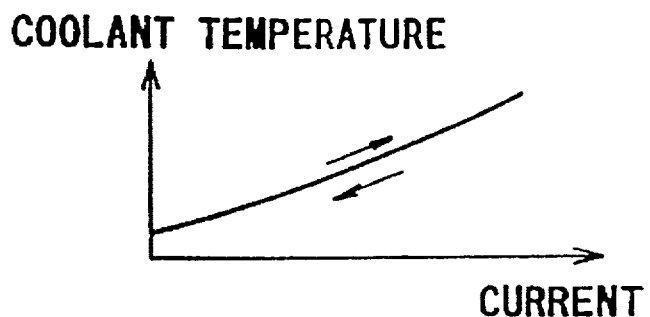
FIG. 14B is a view showing the relationship between the temperature of a coolant and the current at the time of the coolant circulation in the third embodiment shown in FIG. 13.
Figure 14C:
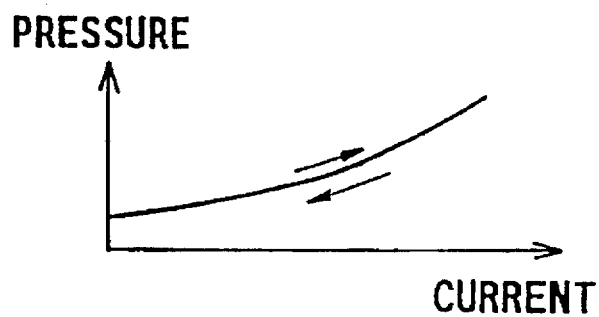
FIG. 14C is a view showing the relationship between the pressure pressing together the fuel cell stack and the current at the time of the coolant circulation in the third embodiment shown in FIG. 13.
Figure 14D:
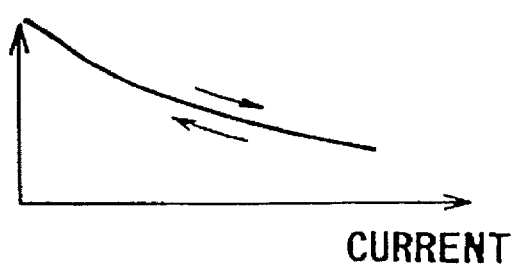
FIG. 14D is a view illustrating the relationship between the contact resistance and the current at the time of the coolant circulation in the third embodiment shown in FIG. 13.

As shown in FIG. 9, in a system for effecting the first embodiment, a circuit 182 comprises a supply pipe 176 and a circulating line 180. The supply pipe 176 extends from a tank 170 for storing either water or methanol as the coolant therein, through a booster pump 174 having a bypass valve 172, to a pipe fitting 150 on an end plate 152 to which the pressurized fluid is introduced. The circulating line 180 extends from a pipe fitting 148 on an end plate 152 from which the pressurized fluid is discharged through a backpressure valve 178, to the tank 170.

The booster pump 174 increases pressure of the coolant and supplies the coolant to the fuel cell stack 10. Thus, the pressure in the pressure chamber 104 of each separator 14 is raised to produce pressure to press together the unit cells and separators of the fuel cell stack. Variations of this pressure and the contact resistance with respect to time are respectively illustrated by graphs shown in FIG. 10. At a point the fuel cell A is started up (the bypass valve 172 is closed and the booster pump 174 is started-up), and at a point h the fuel cell A is shut down (the booster pump 174 is stopped and the bypass valve 172 is opened) During a period in which the fuel cell A is started up, the action for cooling the fuel cell A is thus effected by supplying the increased pressure of coolant to each pressure chamber 104 and the membrane-electrode assembly 124 is held under the uniform pressure by the collectors 110 and 112 so as to reduce the contact resistance. Thus, if the collectors 110 and 1,12 are brought into close contact with the membrane-electrode assembly 124 by pressure, then the contact resistance can be reduced as described above and a high voltage can be outputted from the fuel cell A.

A second embodiment according to the present invention wherein a liquid coolant is used as the pressurized fluid employed in the present invention, will next be described with reference to FIGS. 11 and 12.

As shown in FIG. 11, in a system for effecting the second embodiment, a circuit 198 comprises a supply pipe 194 and a circulating line 196. The supply pipe 194 extends from a tank 190 for storing either water or methanol as the coolant therein, through a circulating pump 192, to a pipe fitting 150 on an end plate 152 of a fuel cell stack 10 to which the pressurized fluid is introduced. The circulating line 196 extends from a pipe fitting 148 on the end plate 152 from which the pressurized fluid is discharged, to the tank 190. A reaction gas G for applying the pressure to the coolant is introduced into an upper portion of the tank 190.

The pressurized coolant is then supplied to the fuel cell stack 10 by the circulating pump 192 so as to increase the pressure in the pressure chamber 104 of each separator 14. As a result, the pressure that presses together the unit cells and separators of the fuel cell stack is generated. Variations of the pressure of the reaction gas, the pressure pressing together the unit cells and the separators and the contact resistance with respect to time are respectively illustrated by graphs shown in FIG. 12. At a point, the fuel cell A is started up, i.e., the pressure of the reaction gas is raised and the pump 192 is started, and at a point, the fuel cell A is made inactive, i.e., the pressure of the reaction gas is reduced and the pump 192 is stopped.

A third embodiment according to the present invention wherein a liquid coolant is used as the pressurized fluid employed in the present invention, will now be described with reference to FIG. 13 and FIGS. 14A through 14D.

As shown in FIG. 13, in a system for effecting the third embodiment, a circuit 208 comprises a supply pipe 204 and a circulating line 206. The supply pipe 204 extends from a tank 200 for storing either a solvent having a low boiling point or methanol as the coolant therein, through a circulating pump 202, to a pipe fitting 150 on an end plate 152 of a fuel cell stack 10 to which the pressurized fluid is introduced. The circulating line 206 extends from a pipe fitting 148 on the end plate 152 from which the pressurized fluid is discharge, to the tank 200. A coolant replenishing line 212 having a check valve 210 meets with the circulating line 206 in the course thereof.

Thus, when the coolant is fed into and circulated in the fuel cell stack 10 by the circulating pump 202, the relationships between the electrical current to be produced and respective items comprising temperature of the fuel cell A, temperature of the coolant, pressure that presses together the unit cells and separators of the fuel cell stack and contact resistance are represented as shown in FIGS. 14A through 14D. That is, when it is desired to increase the current to be produced, the temperature of the fuel call A has to be raised and the temperature of the coolant in each separator increases. As a result, vapor pressure of the coolant is raised so as to increase the pressure pressing together the unit cells and the separators, thus reducing the contact resistance.

Figure 15:
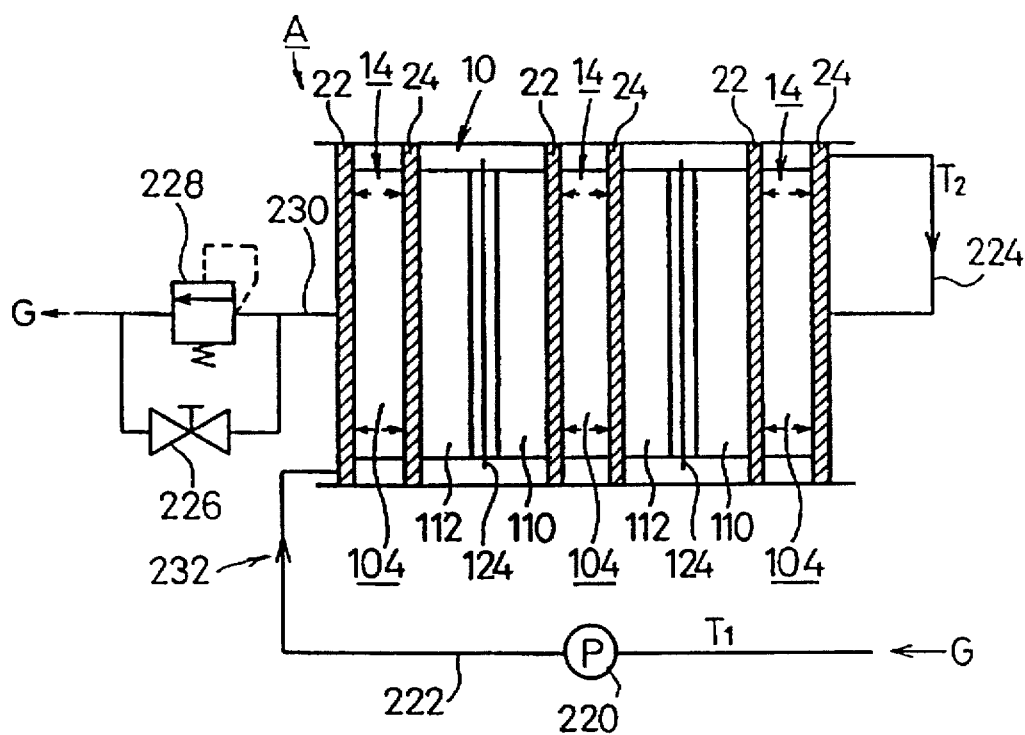
FIG. 15 is a schematic system diagram showing a coolant circulating circuit employed in a fourth embodiment illustrative of a fuel cell stack compressing method according to the present invention.

A fourth embodiment according to the present invention wherein a liquid coolant is employed as the pressurized fluid employed in the present invention, will now be described with reference to FIG. 15.

In a system for affecting the fourth embodiment, a supply circuit 232 comprises a supply pipe 222, a booster pump 220, a relay line 224, and a circulating line 230. The supply pipe 222 supplies either a fuel gas or an oxidant gas as a reaction gas G from an unillustrated tank to a coolant introduction hole, such as at pipe fitting 150, on the pressurized fluid introduction side of a fuel cell stack 10 through the booster pump 220. The relay line 224 connects one of the communication holes, such as pipe fitting 148, for introducing the pressurized fluid in the fuel cell stack 10 with one of through-holes, such as by pipe fitting 140 or 146, for supplying a reaction gas to respective unit cells, on the exterior of the fuel cell stack 10. The circulating line 230 extends from a through-hole, such as by pipe fitting 142 or 144, on the pressurized fluid discharge side and returns to an exhaust or the above tank, through a back-pressure valve 228 having a bypass valve 226.

Thus, the coolant whose pressure has been forcibly boosted by the booster pump 220, is fed into the fuel cell stack 10 to raise the pressure in the pressure chamber 104 of each separator 14, with the result that a fuel call i is cooled simultaneously with the generation of the pressure that presses together the unit cells and separators of the fuel cell stack. Assuming now that the temperature of the supplied reaction gas is represented as $T_1$ and the temperature of the reaction gas in the relay line 224 after cooling the fuel cell is represented as $T_2$, $T_2$ is greater than $T_1$ (i.e., $T_2 > T_1$).

Here, variations in the pressure that presses together the unit cells and separators of the fuel cell stack and the contact resistance with respect to time are identical to those shown by the graphs in FIG. 10, and their graphical representation is omitted.

Figure 16:
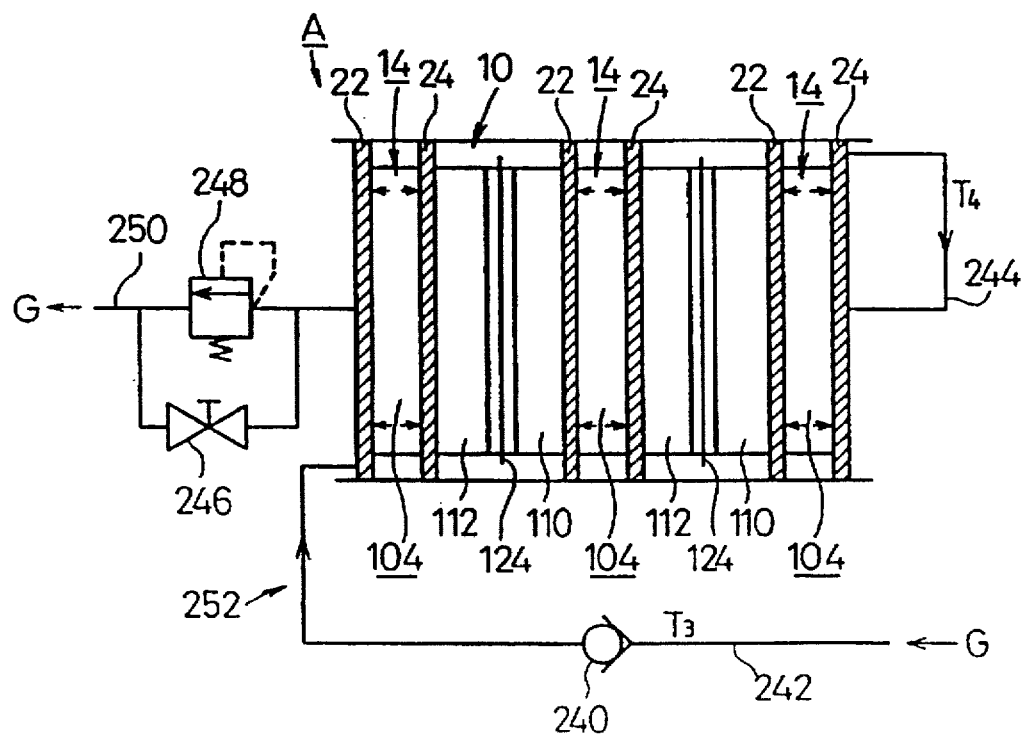
FIG. 16 is a schematic system diagram depicting a coolant circulating circuit employed in a fifth embodiment illustrative of a fuel cell stack compressing method according to the present invention.

A fifth embodiment according to the present invention wherein a gas coolant is used as the pressurized fluid employed in the present invention, will now be described with reference to FIG. 16.

In a system for affecting the fifth embodiment, a supply circuit 252 comprises a supply pipe 242, a relay line 244 and a circulating line 250, similar to the fourth embodiment. The supply pipe 242 supplies either a fuel gas or an oxidant gas as a high-pressure reaction gas from an unillustrated tank to a coolant introduction hole on the pressurized fluid introduction side of a fuel cell stack 10, through a check valve 240. The relay line 244 connects one of the communication holes for introducing the pressurized fluid in the fuel cell stack 10 with one of through-holes for supplying a reaction gas to respective unit cells, on the exterior of the fuel cell stack 10. The circulating line 250 extends from a through-hole on the pressurized fluid discharge side and returns to an exhaust or the above tank through a back-pressure valve 248 having a bypass valve 246.

Thus, the high-pressure reaction gas is fed into the fuel cell stack 10 through the check valve 240 from the supply line 242 to raise the pressure of the pressure chamber 104 of each separator 14, with the result that a fuel cell A is cooled simultaneously with the generation of the pressure that presses together the unit cells and separators of the fuel cell stack. Assuming now that the temperature of the fed high-pressure reaction gas is represented as $T_1$ and the temperature of the reaction gas in the relay line 244 after cooling the fuel cell is represented as $T_4$, $T_4$ is greater than $T_3$ (i.e., $T_4 > T_3$).

Here, variations in the pressure that presses together the unit cells and separators of the fuel cell stack and the contact resistance with respect to time are identical to those represented by graphs in FIG. 10, and their graphical representation is omitted.

A sixth embodiment according to the present invention wherein a gas coolant is used as the pressurized fluid employed in the present invention, will now be described with reference to FIGS. 17, 18A, 18B and 18.

Figure 17:
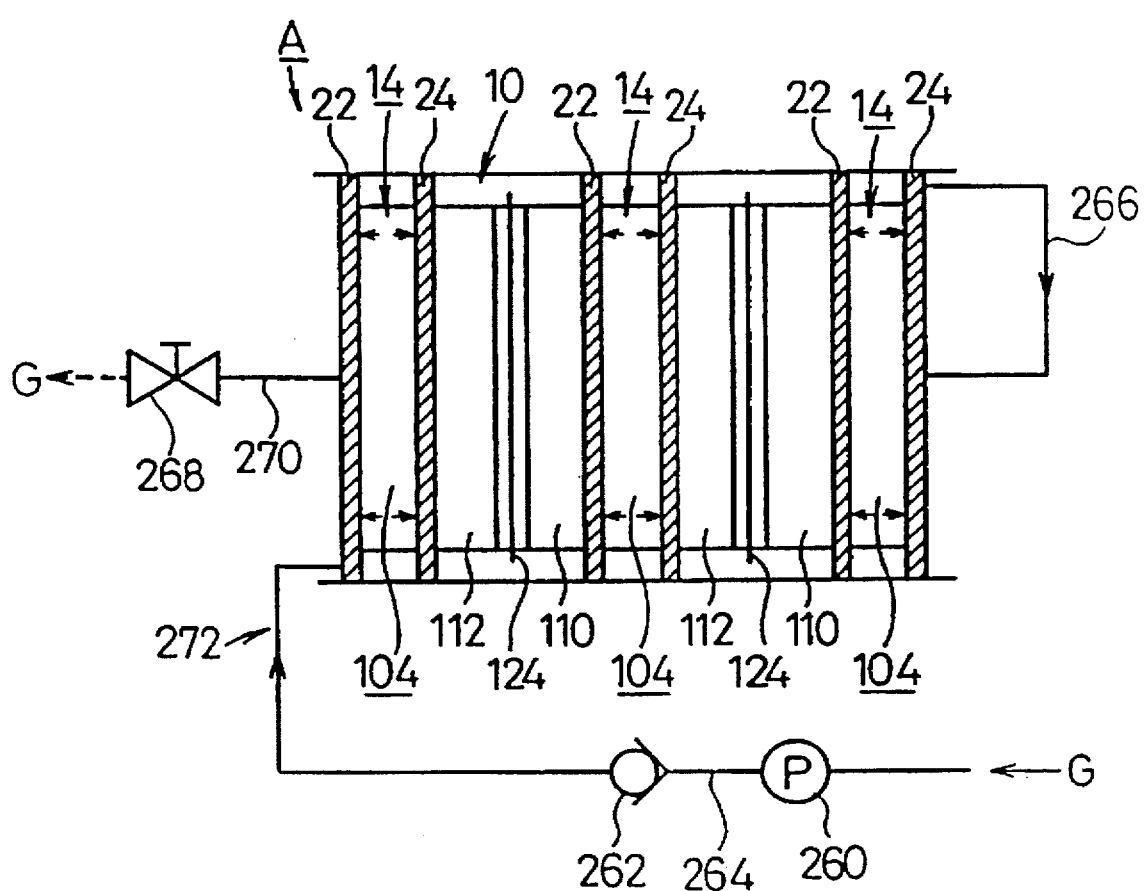
FIG. 17 is a schematic system diagram illustrating a coolant circulating circuit employed in a sixth embodiment illustrative of a fuel cell stack compressing method according to the present invention.

As shown in FIG. 17, in a system for effecting the sixth embodiment, a supply circuit 272 comprises a supply pipe 264, a relay line 266 and a circulating line 270, similar to the fourth and fifth embodiments. The supply pipe 264 supplies either a fuel gas as a reaction gas or an oxidant gas from an unillustrated tank to a coolant introduction hole on the pressurized fluid introduction side of a fuel cell stack 10, through a booster pump 260 and a check valve 262. The relay line 266 connects one of the communication holes for introducing the pressurized fluid in the fuel cell stack 10 with one of through-holes for supplying a reaction gas to respective unit cells, on the exterior of the fuel cell stack 10. The circulating line 270 extends from a through-hole on the pressurized fluid discharge side and returns to the above tank, through a throttle valve 268.

Thus, when the booster pump 260 is used to have the reaction gas pass through the check valve 262 through the supply line 264 so that the reaction gas is fed into the fuel cell stack 10, the reaction gas is retained in the fuel cell stack 10 by the check valve 262 and the throttle valve 268. Accordingly, the reaction gas cools the fuel cell A in response to the heat produced at the time of activation of the fuel cell A and is spontaneously raised in pressure simultaneously with its cooling. Therefore, the high-pressurized reaction gas increases the pressure of the pressure chamber 104 of each separator 14 so that the pressure to be generated by the pressure generating plates 22 and 24 is raised. Thus, the pressure that presses together the unit cells and separators of the fuel cell stack is produced.

Figures 18A, 18B, 18C:
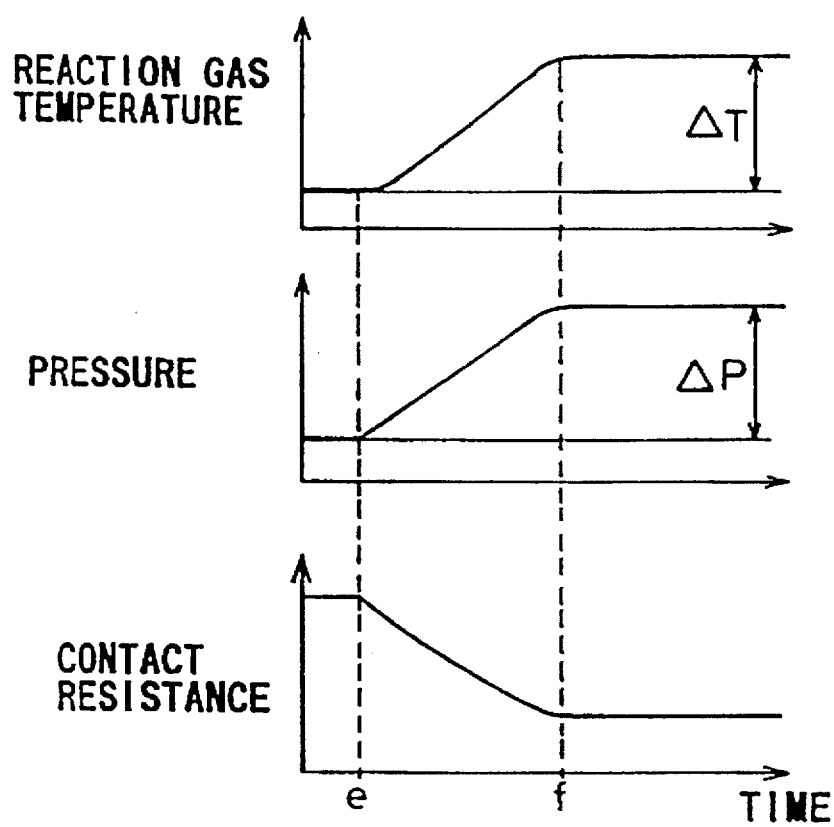
FIGS. 18A, 18B and 18C are graphs showing the mutual relationship among the temperature of the reaction gas, the pressure pressing together the fuel cell stack, the contact resistance and the time at the time of the coolant circulation in the sixth embodiment shown in FIG. 17.

Here, the variations of temperature of the reaction gas, the pressure that presses together the unit cells and separators of the fuel cell stack and the contact resistance in each of the stacked unit cells with respect to time are represented by graphs shown in FIGS. 18A, 18B, and 18C.

In the graphs shown in FIG. 18A, 18B and 18C a point e shows the time at which an increase in pressure of each pressure chamber 104 is started, and a point f shows the time at which the increase in pressure of each pressure chamber 104 is completed. AT and AP respectively show a difference in temperature of reaction gas and a difference in raised pressure.

Next, another embodiment of the present invention will be described. In the foregoing embodiments, the cell unit (power generating section) 12 includes the first electrode catalyst layer 128a and the second electrode catalyst layer 128b provided integrally with the solid polymer electrolyte membrane 126 interposed therebetween. In that structure, the first separator (collector) 112 composed of a porous material or a carbon material is brought into contact with the first electrode catalyst layer 128a. However, in this new embodiment, an electrode disposed on a fuel gas side is provided contrarily by separating it from a solid polymer electrolyte membrane while an electrode disposed on an oxidant side is arranged on an opposite side with respect to the solid polymer electrolyte membrane.

Figure 19:
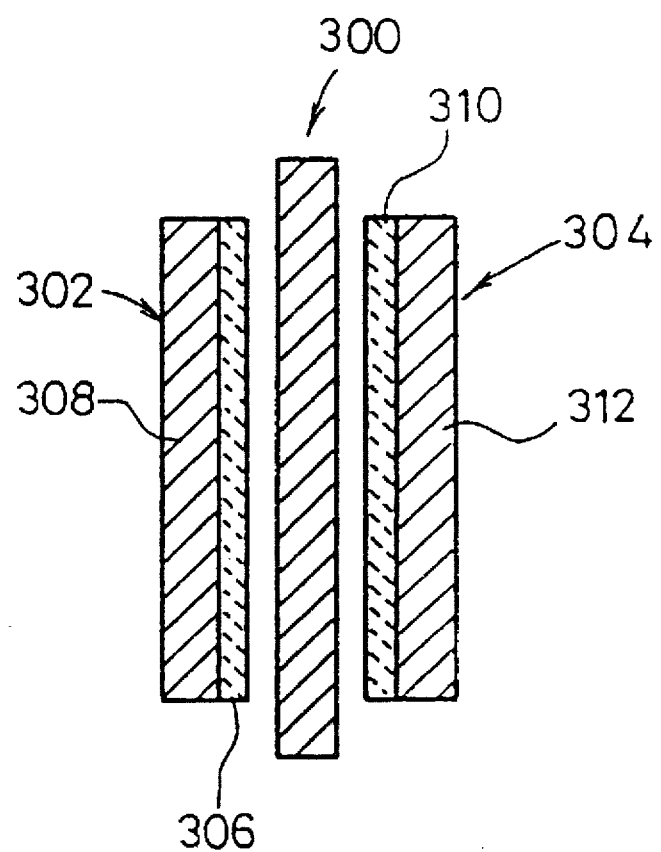
FIG. 19 is a lateral cross-sectional view concerning another embodiment of a solid polymer electrolyte membrane type fuel cell stack according to the present invention, showing a state in which a solid polymer electrolyte membrane, an electrode disposed on a fuel gas side, and an electrode disposed on an oxidant gas side are separately provided.

Namely, as shown in FIG. 19, a solid polymer electrolyte membrane 300 is provided separately from an electrode 302 disposed on a fuel gas side, and the solid polymer electrolyte membrane 300 is also separated from an electrode 304 disposed on an oxidant gas side. The electrode 302 disposed on the fuel gas side comprises an electrode catalyst layer 306 and a gas diffusion layer 308 composed of carbon paper, which are integrally formed together beforehand. On the other hand, the electrode 304 disposed on the oxidant gas side comprises an electrode catalyst layer 310 and a gas diffusion layer 312 composed of carbon paper, the electrode catalyst layer 310 disposed on the oxidant gas side and the gas diffusion layer 312 being integrally formed together beforehand in the same manner as the electrode 302 disposed on the fuel gas side, Therefore, the assembly, in which the electrode catalyst layer and the gas diffusion layer both generally composed of extremely thin films, are previously integrated, is more advantageous than the assembly in which the first electrode catalyst layer 128a and the second electrode catalyst layer 128b are provided on the solid polymer electrolyte membrane 124, in that the former is more easily produced, maintained, and kept than the latter. In this embodiment, instead of the arrangement as described above, the solid polymer electrolyte membrane 300, the electrode 302 disposed on the fuel gas side, and the electrode 304 disposed on the oxidant gas side may be separately prepared. The solid polymer electrolyte membrane 300, the electrode 302 disposed on the fuel gas side, and the electrode 304 disposed on the oxidant gas side may be integrally assembled to form a cell unit by means of, for example, hot pressing before assembling a fuel cell stack as a whole.

Figure 20:
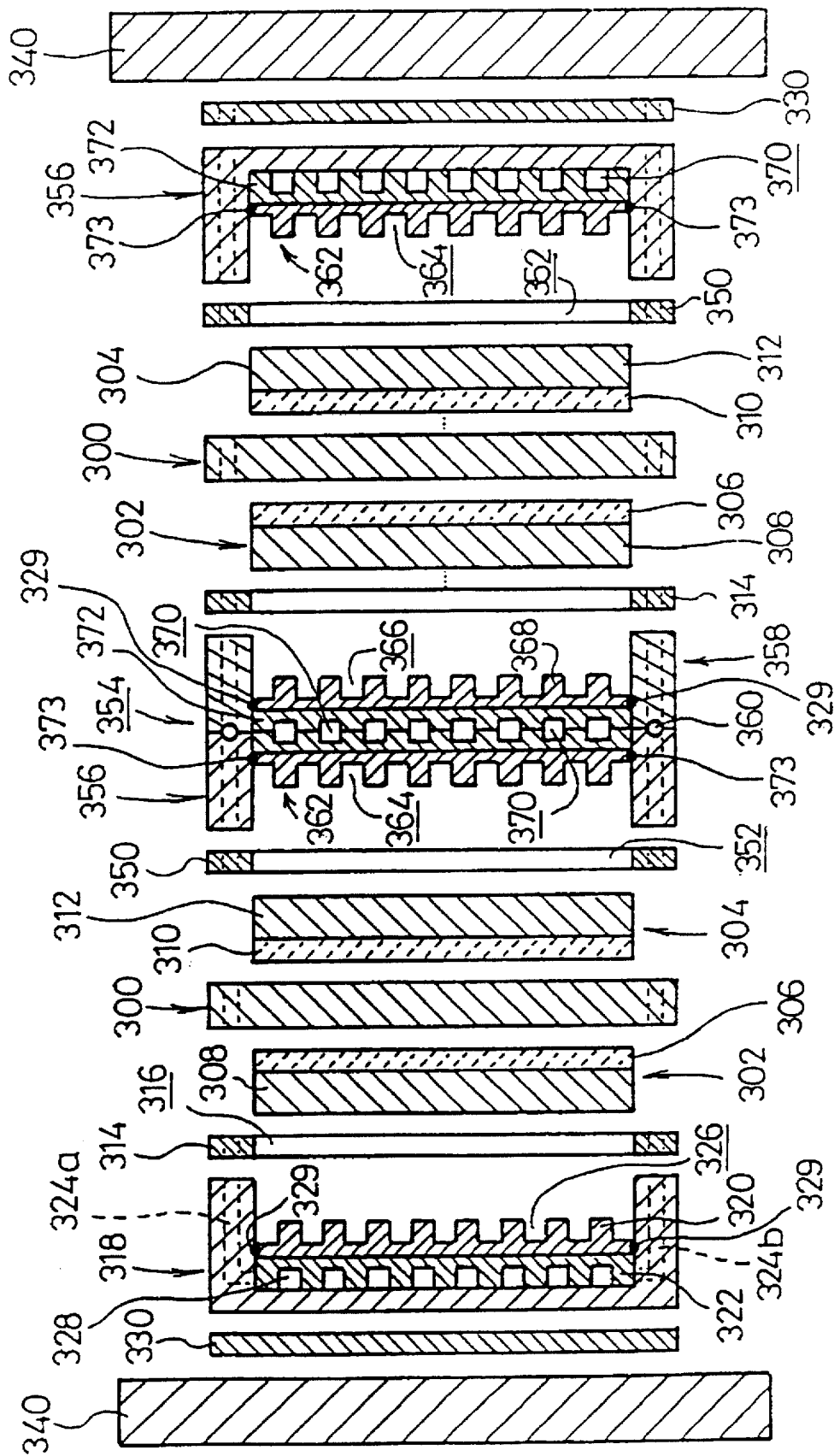
FIG. 20 is an exploded lateral cross-sectional view with partial omission concerning the embodiment of the solid polymer electrolyte membrane type fuel cell stack according to the present invention as illustrated in FIG. 19, showing a structure in which cell units (power generating sections), separators, gaskets, and other components are integrally assembled.

FIG. 20 shows a structure to assemble the cell units constructed as described above by principally using separators, gaskets, and other components into a fuel cell stack.

At first, a gasket 314 is arranged on a side of the electrode 302 disposed on the fuel gas side so that its one end surface is brought into contact with a peripheral edge of the solid polymer electrolyte membrane 300. The gasket 314 includes a hole 316 formed to fit the electrode 302 disposed on the fuel gas side thereinto with a slight clearance. The other end surface of the gasket 314 is brought into contact with an end surface of a separator 318 having a C-shaped cross section as illustrated in FIG. 20. The separator 318 is composed of a dense material such as carbon and stainless steel, including, in its inside, a fuel gas guide member 320 and a water guide member 322, each composed of a porous material. The separator 318 includes, in its inside, water guide passages 324a, 324b. The fuel gas guide member 320 is provided with a plurality of guide passages 326 for allowing a fuel gas to pass therethrough. The water guide member 322 is also provided with water guide passages 328 for allowing water to pass therethrough from one of the water guide passages 324a, 324b to the other.

The fuel gas guide member 320 and the water guide member 322 are joined to the separator 318 through a conductive member 329, such as conductive rubber and conductive resin. Therefore, water guided through the water guide passages 328 is prevented from directly flowing into the gas guide passages 326.

In this embodiment, it is preferred that water is allowed to flow through the water guide passages 328 upwardly, while the fuel gas introduced into the gas guide passages 326 is allowed to flow downwardly so that the water and the fuel gas flow in countercurrents with each other. When the fuel gas flows downwardly water coming from the water guide member 322 permeates into the fuel gas guide member 320 composed of the porous material. Accordingly, the water gradually humidifies the fuel gas during power generation. The humidified fuel gas is cooled by water flowing upwardly at a low temperature. Thus the temperature distribution in the cell unit can be made uniform.

An insulating member 330 is inserted adjacent to a surface of the separator 318 opposite to the gasket 314, and the insulating member 330 is in contact with an end plate 340. The end plate 340 is provided with fuel gas supply and discharge ports, cooling water inflow and outflow ports, and oxidant gas inlet and outlet ports (not shown) having respective shapes similar to those in the aforementioned embodiments.

A gasket 350 having substantially the same shape as that of the gasket 314 is provided on the side of electrode 304, opposite to the electrode 302 disposed on the fuel gas side. The gasket 350 receives with a slight clearance the electrode 304 on the oxidant gas side including the electrode catalyst layer 310 on the oxidant gas side and the gas diffusion layer 312 formed integrally in the same manner as the gasket 314. Therefore the gasket 350 is provided with a large open hole 352 in the same manner as the hole 316 of the gasket 314.

A separator 354 is provided, which is brought into contact with one end surface of the gasket 350, and receives a part of the electrode 304 disposed on the oxidant gas side. The separator 354 is generally divided into a separator 356 on the oxidant gas side and a separator 358 on the fuel gas side of the next cell unit. An O-ring 360 is provided between the separator 356 on the oxidant gas side and the separator 358 on the fuel gas side so that both separators 356, 358 are interrupted or separated from one another in a liquid-tight manner.

An oxidant gas guide member 362 is provided in the separator 356 on the oxidant gas side. The oxidant gas guide member 362 includes a plurality of oxidant gas guide passages 364 for guiding the oxidant gas, the oxidant gas guide passages 364 extending vertically in parallel to one another. On the other hand, the separator 358 on the fuel gas side is provided with a fuel gas guide member 368 including a plurality of vertically extending gas guide passages 366 in the same manner as the separator 318. A water guide member 372 including a plurality of water guide passages 370 provided in the vertical direction is provided between the separator 356 on the oxidant gas side and the separator 358 on the fuel gas side. Actually, the water guide member 372 is vertically divided into two pieces. In this embodiment, the separator 356 on the oxidant gas side, the separator 358 on the fuel gas side, the oxidant gas guide member 362, the fuel gas guide member 368, and the water guide member 372 are joined especially by using conductive members. They are preferably joined by using a conductive material 373 composed of conductive rubber or conductive resin.

Figure 21:
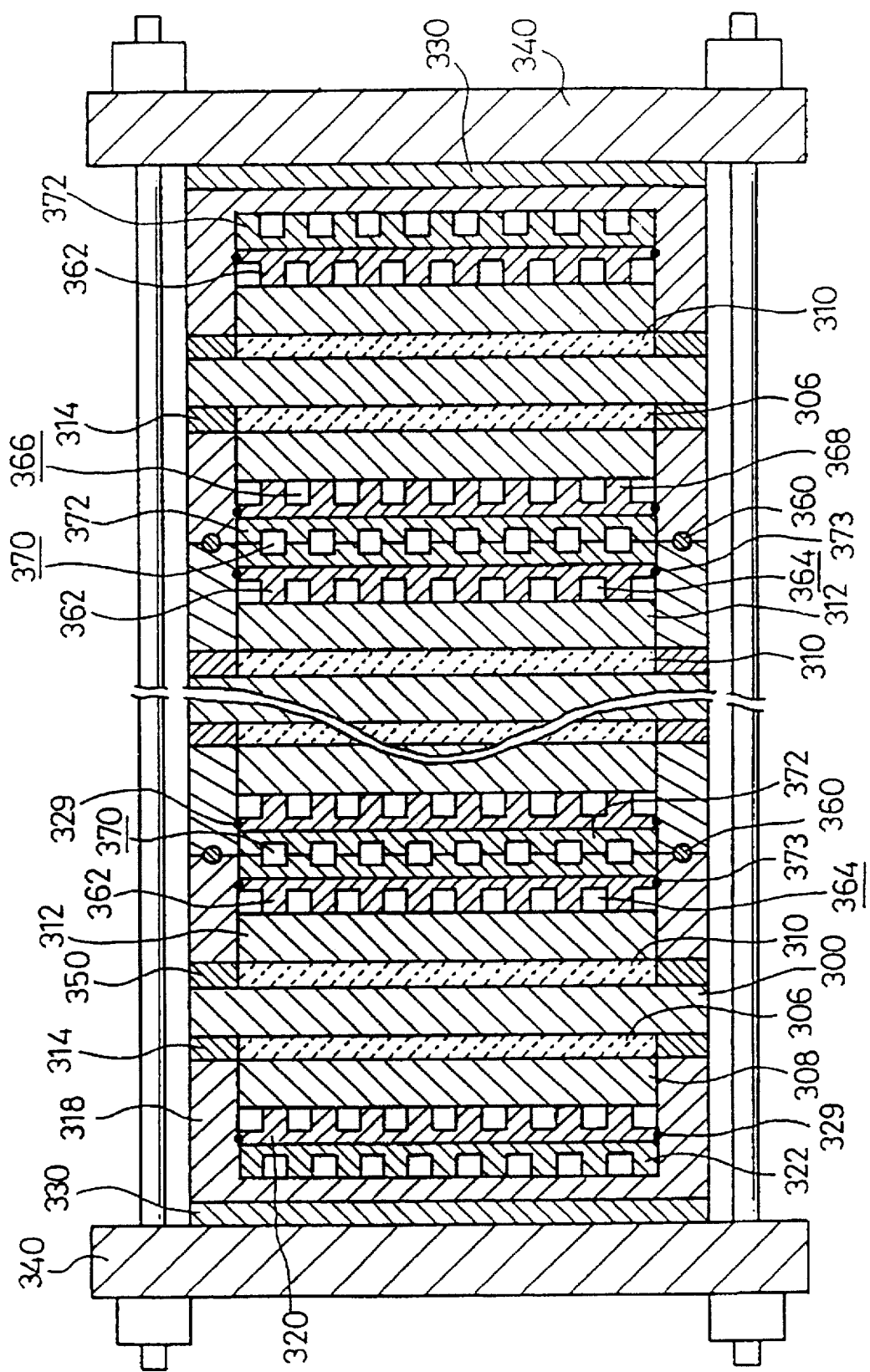
FIG. 21 is a lateral cross-sectional view with partial omission showing a state in which the fuel cell stack is constructed by interposing the cell units and other components as illustrated in FIG. 20 between end plates.

Thus, a plurality of sets of the solid polymer electrolyte membrane 300, the electrode 302 disposed on the fuel gas side, the electrode 304 disposed on the oxidant gas side, the separator 318, the separator 354, and other components are stacked to construct the solid polymer electrolyte membrane type fuel cell stack as illustrated in FIG. 21. In this embodiment, detailed explanation is omitted for passages for the fuel gas the oxidant gas, and water, however, they will be readily and clearly understood by those skilled in the art and from the previously described embodiments.

The operation of the solid polymer electrolyte membrane type fuel cell stack constructed as described above will be explained. The fuel gas is allowed to flow vertically downwardly through the gas guide passages 326. On the other hand, water is supplied vertically upwardly through the water guide passages 328 in the water guide member 322. Similarly, the oxidant gas is supplied downwardly through the oxidant gas guide passages 364 in the oxidant gas guide member 362. Water is supplied vertically upwardly in a counter current through the water guide passages 370. Therefore, both the fuel gas guide member 320 and the oxidant gas guide member 362 are humidified.

Accordingly, the fuel gas introduced through the gas guide passages 326 presses the electrode 302 disposed on the fuel gas side by means of its pressure so that the electrode 302 itself is brought into close contact with the solid polymer electrolyte membrane 300. Similarly, the other surface of the solid polymer electrolyte membrane 300 is filled with the oxidant gas introduced into the oxidant gas guide passages 364 so that the electrode 304 disposed on the oxidant gas side is brought into close contact with the solid polymer electrolyte membrane 300.

Thus the power generating operation is effected in the same manner as described in the foregoing embodiments.

As described above, according to this embodiment, the solid polymer electrolyte membrane 300 is provided separately from the electrode 302 disposed on the fuel gas side and the electrode 304 disposed on the oxidant gas side. Accordingly, they can be produced extremely easily in large amounts. Therefore, as for the entire fuel cell stack, a low price can be achieved. Moreover, the fuel cell stack can be assembled more easily, and it can be readily maintained and kept.

Figure 22:
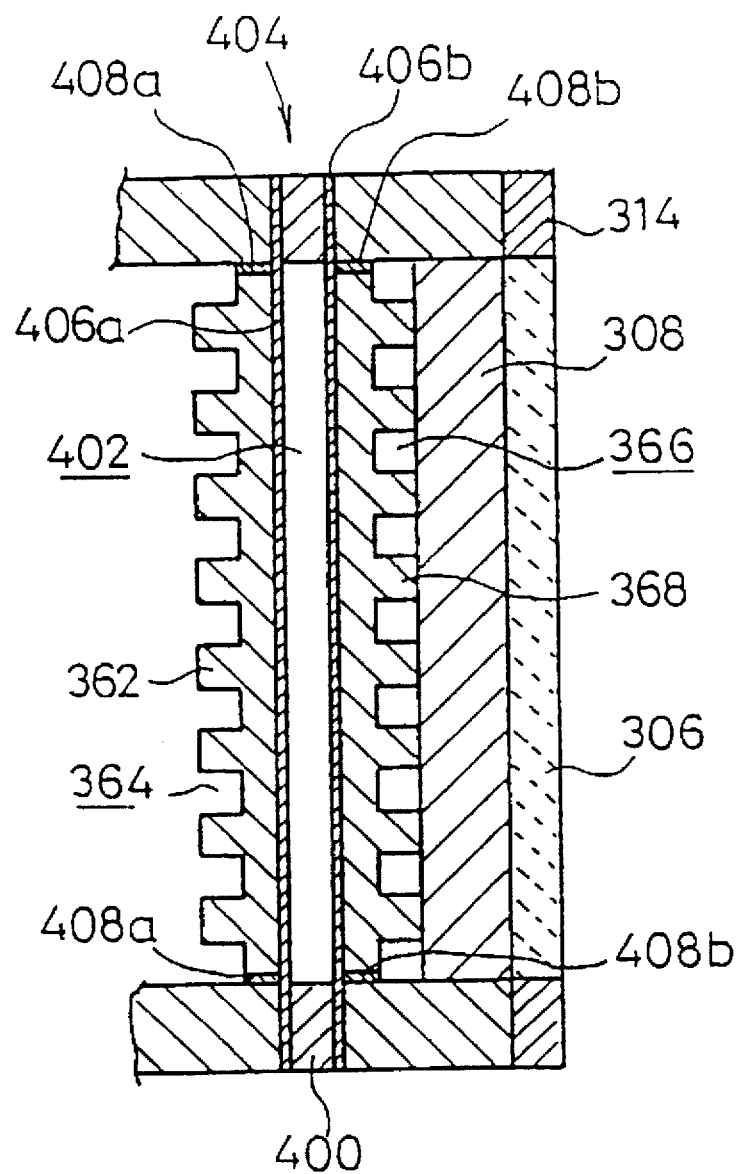
FIG. 22 is a vertical cross-sectional view with partial omission concerning still another embodiment of the present invention, showing a solid polymer electrolyte membrane type fuel cell stack in which surface pressure generating plates are used.

Still another embodiment of the present invention is shown in FIG. 22, wherein components that are the same as in the preceding embodiment are identified by the same numerals. In this embodiment, there is provided no groove-shaped water guide passage 370 as provided in the water guide member 372. This embodiment is contrarily constructed by using a parallel pipe-shaped or rectangular parallel pipe-shaped frame 400 with its largely open central portion, providing a space 402 having a large volume so that a water guide member 404 is constructed as a whole. Both side surfaces of the frame 400 are closed by surface pressure generating plates 406a, 406b each composed of a porous material such as porous carbon. In this arrangement, boundary portions between the frame 400 and an oxidant gas guide member 362 and between the frame 400 and a fuel gas guide member 368 are sealed by seal members 408a, 408b made of conductive rubber or conductive resin.

In this arrangement, when water is allowed to flow upwardly in a direction perpendicular to the plane of the paper of FIG. 22, the space 402 is filled with water. Accordingly, the surface pressure generating plates 406a, 406b are bent in directions to create a separation from each other which presses on the oxidant gas guide member 362 and the fuel gas guide member 368, and humidify them by supplying appropriate amounts of moisture to them. This construction is also applicable to other components such as a water guide member 322 between another fuel gas guide member 368 and another oxidant gas guide member 362. It is needless to say that the construction of the water guide member 322 or other components can be simplified by using the surface pressure generating plates 406a, 406b.

Figure 23:
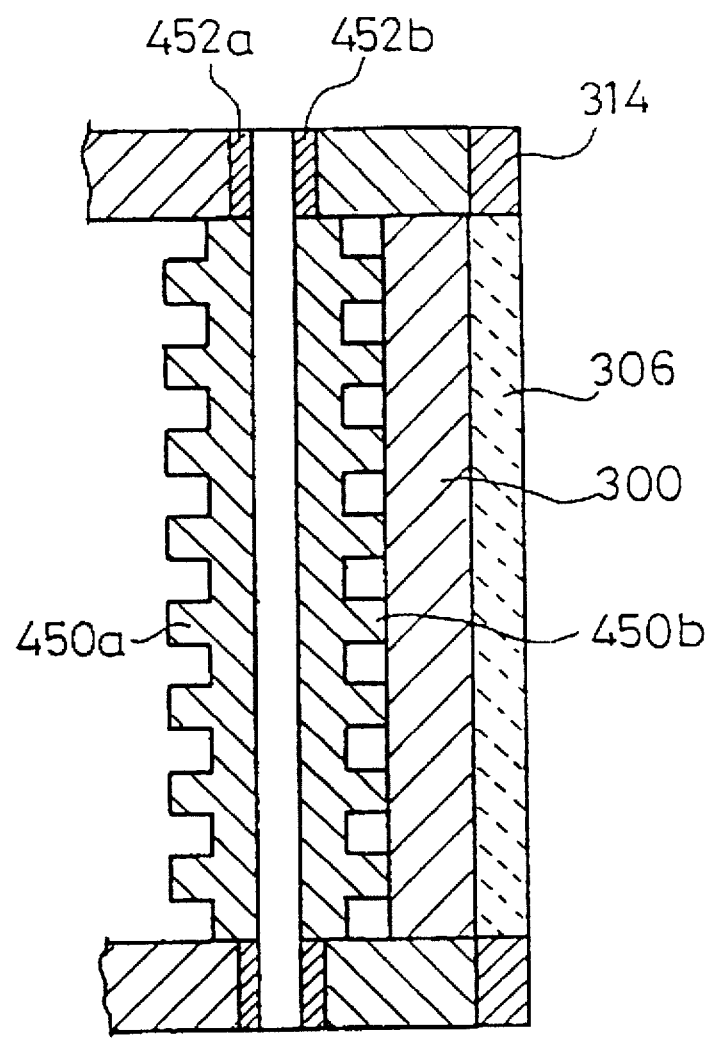
FIG. 23 is a vertical cross-sectional view with partial omission concerning still another embodiment of the present invention, showing a solid polymer electrolyte membrane type fuel cell stack in which surface pressure generating plates and gas guide members are unified, and conductive members are arranged in the periphery thereof.

FIG. 23 shows still another embodiment of the present invention. This embodiment comprises an oxidant gas guide and press plate 450a and a fuel gas guide and press plate 450b, the oxidant gas guide and press plate 450a being an integrated member embracing the surface pressure generating plate 406a and the oxidant gas guide member 362 shown in FIG. 22, and the fuel gas guide and press plate 450b being an integrated member embracing the surface pressure generating plate 406b and the fuel gas guide member 368 shown in FIG. 22. Members composed of conductive rubber or conductive resin 452a, 452b are embedded in the periphery of the oxidant gas guide and press plate 450a and the fuel gas guide and press plate 450b.

In this arrangement, it is unnecessary to provide the surface pressure generating plates 406a, 406b which would be otherwise provided additionally and independently as in the embodiment shown in FIG. 22. Accordingly, the number of parts can be decreased, and the assembling operation becomes easy as well.

Figure 24:
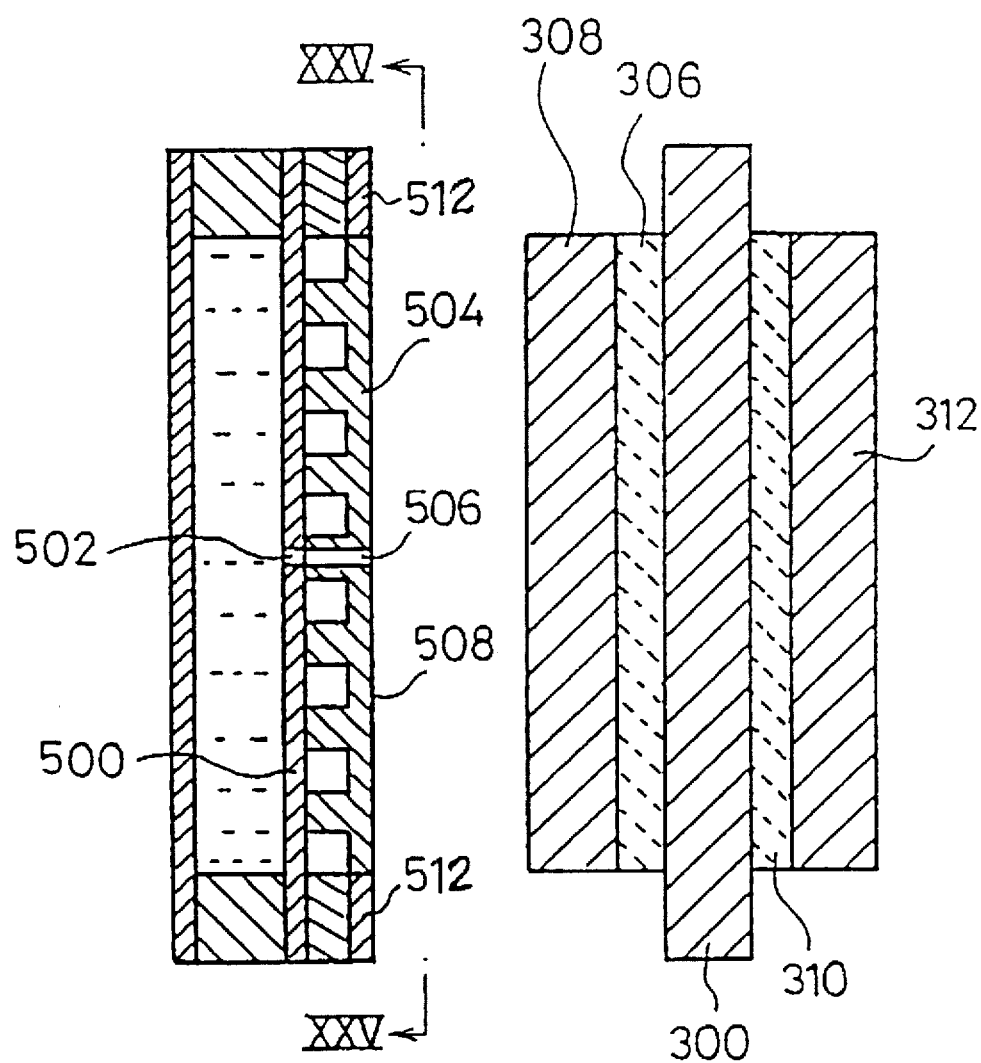
FIG. 24 is a schematic vertical cross-sectional view concerning still another embodiment of the present invention, showing a solid polymer electrolyte membrane.
Figure 25:
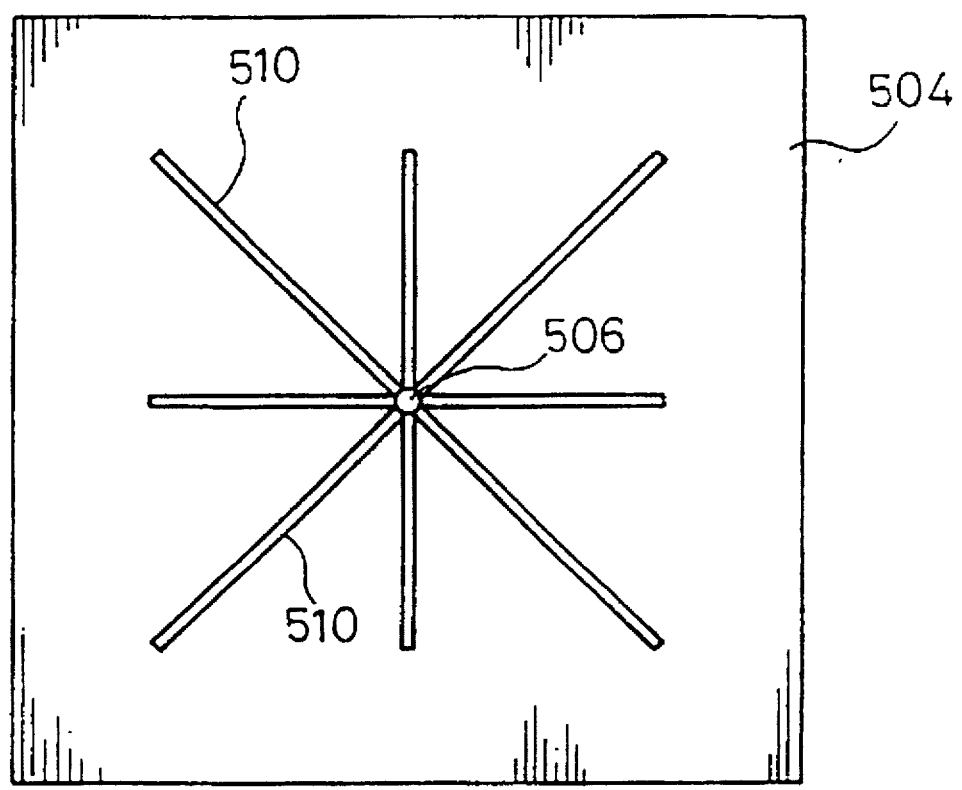
FIG. 25 is an elevation view as viewed along arrows in FIG. 24 and taken along a line XXV—XXV in FIG. 24.
Figure 26:
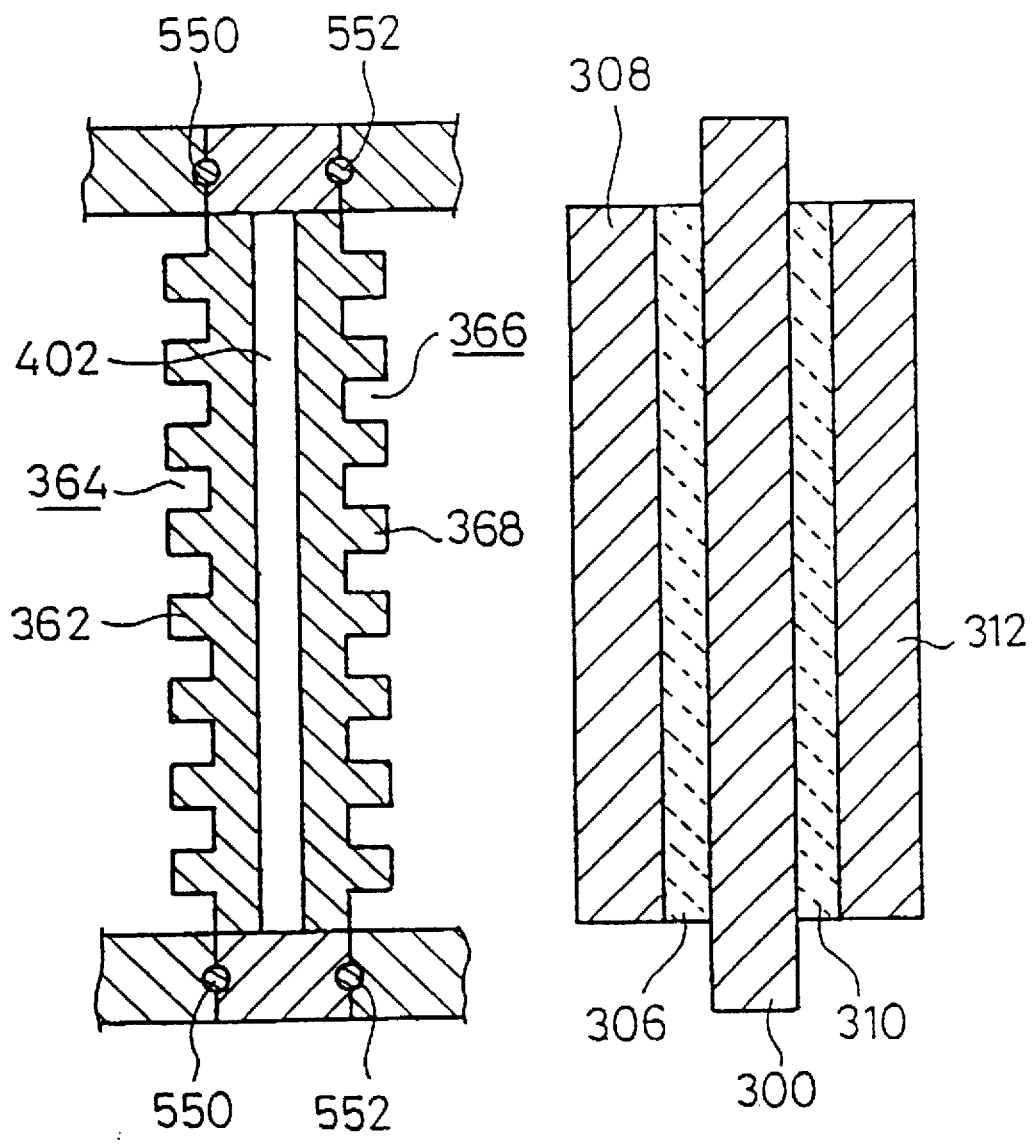
FIG. 26 is a schematic vertical cross-sectional view concerning still another embodiment of the present invention, showing a solid polymer electrolyte membrane.

FIGS. 24 and 25 show still another embodiment of the present invention. This embodiment is different from the embodiment shown in FIG. 22 in that a water outflow port 502 is defined at an approximately central portion of a surface pressure generating plate 500, and the water outflow port 502 communicates with a small hole 506 provided in a fuel gas guide member 504. The fuel gas guide member 504 has its flat surface 508 which is brought into uniform contact with a gas diffusion layer composed of carbon paper of a cell unit. Its contact surface includes a plurality of radial grooves 510 engraved as shown in FIG. 25. A member 512 composed of a dense material is arranged in the periphery of the fuel gas guide member 504.

According to the arrangement as described above, water can be directly supplied to the cell unit. Thus this embodiment achieves rapid start up of the fuel cell stack and sufficient supply of water.

FIG. 25 shows a modified embodiment of the embodiment illustrated in FIG. 22. Seal members 550, 552 are arranged outside an oxidant gas guide member 362 and a fuel gas guide member 368.

According to the solid polymer electrolyte membrane type fuel cell stack concerning the present invention of the embodiments of FIGS. 19-26, the following advantages are obtained. Namely, since the first separator for constructing the cooling chamber is made of the water-permeable material, preferably porous carbon, water supplied to the cooling chamber passes through the first separator composed of porous carbon, and moisture is supplied through the electrode to the solid polymer electrolyte membrane uniformly. Simultaneously, the pressing force is increased by the displacing action or the deforming action caused by the pressure of supplied water. Thus the solid polymer electrolyte membrane is humidified by using water for cooling. Accordingly, it is unnecessary to specifically provide a humidifying mechanism, and the fuel cell stack can be made compact as a whole. Since the cooling chamber is provided for every unit cell, the solid polymer electrolyte membrane of each unit cell can be uniformly humidified. Therefore, the electric resistance in the solid polymer electrolyte membrane can be decreased in cooperation with the uniform pressing force. Moreover, the contact resistance concerning ionic conduction and electronic conduction can be suppressed to be small, providing a good energy efficiency as well. Moreover, the solid polymer electrolyte membrane, the electrode disposed on the fuel gas side, and the electrode disposed on the oxidant gas side are separately provided. The electrode itself is provided in the separated conformation comprising the electrode catalyst layer and the gas diffusion layer. Therefore, special advantages are obtained in that the cell unit can be easily produced, the product can be provided at a low price, and the fuel cell stack can be easily maintained and kept. In the present invention, the thin carbon paper is used as the gas diffusion layer. Accordingly, the permeability for gas is improved, resulting in an advantage that the power generation performance is further improved as well.

Summing up all of the embodiments referred to above, in the fuel cell stack and the method of pressing together the same according to the present invention, a pressurized fluid is introduced into a pressure chamber formed in each separator and the pressure is transferred to collectors, each made of a rigid body, from pressure generating plates which serve as the pressure transfer membranes. As a result, collectors are slightly displaced to be pressed against surfaces of the solid polymer electrolyte membrane. It is therefore unnecessary to maintain the high accuracy in the thickness of the collectors as in the conventional fuel cell stack. Since each of the collectors is a rigid body, the solid polymer electrolyte membrane is uniformly pressed by the collectors, and the contact resistance between the collectors and the solid polymer electrolyte membrane is reduced with an improvement in the efficiency of power generation.

Further, since each separator has a cooling function by using a coolant as the pressurized fluid, no temperature difference is developed between the unit cells in the fuel cell stack, thereby a stable operation of the fuel cell stack is enabled. The pressure for pressing together the fuel cell stack is raised due to an increase in the vapor pressure of the coolant. It is therefore unnecessary to separately provide separators each having a cooling function.

It is also unnecessary to additionally provide a pressure applying means if a high pressure fluid produced by the energy of heat at the time of reformation of a fuel or the energy of heat of a fuel cell, is used as a pressurized fluid.

Furthermore, since the normal squeezing of each cell unit in the fuel cell stack is unnecessary, elastic materials in respective constituent parts of unit cells bear less elastic fatigue. When the constituent members of the cell unit are released from contact with each other upon deactivation of the fuel cell, the electric corrosion between each separator and each of the electrode catalysts can also be prevented and a long life of the fuel cell stack can hence be expected.

When a liquid coolant is used as a pressurized fluid, the supply of the heat of vaporization of methanol at the time of reformation of methanol/steam and the reformation of a fuel in each separator can be effected. Further, the cold resistance can also be obtained.

When, on the other hand, a gas coolant is used as the pressurized fluid, a gas preheating function can be expected in each separator.

We claim:

1. A fuel cell stack of a solid polymer electrolyte membrane type comprising:

a solid polymer electrolyte membrane having a fuel gas side and an oxidant gas side;

a first electrode formed separately from said solid polymer electrolyte membrane and displaceably disposed on said fuel gas side for being pressed, under a pressure of a fuel gas, into contact with one surface of said solid polymer electrolyte membrane;

a second electrode formed separately from said solid polymer electrolyte membrane and displaceably disposed on said oxidant gas side for being pressed, under a pressure of an oxidant gas, into contact with the other surface of said solid polymer electrolyte membrane;

a first separator, arranged adjacent to said first electrode disposed on said fuel gas side, for receiving said fuel gas; and a second separator, arranged adjacent to said second electrode disposed on said oxidant gas side, for receiving said oxidant gas;

said first electrode disposed on said fuel gas side integrally formed of an electrode catalyst layer facing said fuel gas side of said membrane and a fuel gas diffusion layer, and said second electrode disposed on said oxidant gas side integrally formed of an electrode catalyst layer facing said oxidant gas side of said membrane and an oxidant gas diffusion layer.

2. A fuel cell stack according to claim 1, wherein said fuel gas diffusion layer of said first electrode disposed on said fuel gas side comprises carbon paper.

3. A fuel cell stack according to claim 1, wherein said oxidant gas diffusion layer of said second electrode disposed on said oxidant gas side comprises carbon paper.

4. A fuel cell stack according to claim 2, wherein said oxidant gas diffusion layer of said second electrode disposed on said oxidant gas side comprises carbon paper.

5. A fuel cell stack according to any one of claims 1 to 4, wherein said first separator has fuel gas supply passages and water supply passages separately extending inside said first separator in directions parallel to said solid polymer electrolyte membrane, and said fuel gas diffusion layer of said first electrode disposed on said fuel gas side faces said fuel gas supply passages.

6. A fuel cell stack according to claim 5, wherein fuel gas flowing through said fuel gas supply passages and water flowing through said water supply passages flow in mutually opposite counterflow directions.

7. A fuel cell stack according to any one of claims 1 to 4, wherein said second separator has oxidant gas supply passages and water supply passages separately extending inside said second separator in directions parallel to said solid polymer electrolyte membrane, and said oxidant gas diffusion layer of said second electrode disposed on said oxidant gas side faces said oxidant gas supply passages.

8. A fuel cell stack according to claim 5, wherein said second separator has oxidant gas supply passages and water supply passages separately extending inside said second separator in directions parallel to said solid polymer electrolyte membrane, and said oxidant gas diffusion layer of said second electrode disposed on said oxidant gas side faces said oxidant gas supply passages.

9. A fuel cell stack according to claim 7, wherein oxidant gas flowing through said oxidant gas supply passages and water flowing through said water supply passages flow in mutually opposite counterflow directions.

10. A fuel cell stack according to claim 8, wherein oxidant gas flowing through said oxidant gas supply passages and water flowing through said water supply passages flow in mutually opposite counterflow directions.

11. A fuel cell stack according to any one of claims 1 to 4, wherein said first and second separators are made of a porous material selected from the group consisting of a carbon material, a conductive porous sintered metal, a porous conductive rubber, a porous conductive resin, and any combination thereof, respectively.

12. A fuel cell stack according to claim 5, wherein said first and second separators are made of a porous material selected from the group consisting of a carbon material, a conductive porous sintered metal, a porous conductive rubber, a porous conductive resin, and any combination thereof respectively.

13. A fuel cell stack according to claim 7, wherein said first and second separators are made of a porous material selected from the group consisting of a carbon material, a conductive porous sintered metal, a porous conductive rubber, a porous conductive resin, and any combination thereof respectively.

14. A fuel cell stack according to claim 11, wherein said porous material for constructing said first separator has a porosity of not more than 70% and a pore diameter of not more than 40 µm.

15. A fuel cell stack according to claim 5, wherein said porous material for constructing said first separator has a porosity of not more than 70% and a pore diameter of not more than 40 µm.

* * * * *

UNITED STATES PATENT AND TRADEMARK OFFICE
CERTIFICATE OF CORRECTION

PATENT NO.   : 5,736,269
DATED        : April 7, 1998
INVENTOR(S)  : Okamoto, et al It is certified that error appears in the above-identified patent and that said Letters Patent is hereby corrected as shown below:

Column 9, line 35, delete "FIG. 10" and insert -- FIGS. 10A and 10B --

Column 9, line 53, delete " and 12" and insert -- , 12A, 12B and 12C --

Column 10, line 7, delete "FIG. 12" and insert -- FIGS. 12A, 12B and 12C --

Signed and Sealed this

Ninth Day of February, 1999

Attest:

Attesting Officer

Acting Commissioner of Patents and Trademarks